United States Patent [19]

Mishima

[11] Patent Number: 5,337,087
[45] Date of Patent: Aug. 9, 1994

[54] VIDEO SIGNAL ENCODING APPARATUS
[75] Inventor: Hidetoshi Mishima, Nagaokakyo, Japan
[73] Assignee: Mitsubishi Denki Kabushiki Kaisha, Tokyo, Japan
[21] Appl. No.: 29,941
[22] Filed: Mar. 9, 1993

Related U.S. Application Data

[63] Continuation of Ser. No. 820,913, Jan. 15, 1992, abandoned.

[30] Foreign Application Priority Data

| Jan. 17, 1991 | [JP] | Japan | 3-003758 |
| Jun. 13, 1991 | [JP] | Japan | 3-141531 |
| Jun. 18, 1991 | [JP] | Japan | 3-145752 |
| Jan. 7, 1992  | [JP] | Japan | 4-000904 |

[51] Int. Cl.⁵ .................................... H04N 7/133
[52] U.S. Cl. ................................ 348/405; 348/408
[58] Field of Search ............. 358/133, 135, 136, 138, 358/13; 348/405, 408; H04N 7/133

[56] References Cited

U.S. PATENT DOCUMENTS

| 4,517,596 | 5/1985  | Suzuki        | 358/133 |
| 4,922,273 | 5/1990  | Yonekawa et al. | 358/429 |
| 4,972,260 | 11/1990 | Fujikawa      | 358/136 |
| 5,047,852 | 9/1991  | Hanyu et al.  | 358/133 |

FOREIGN PATENT DOCUMENTS

| 0053064    | 6/1982 | European Pat. Off. | H04N 7/13  |
| 0231021    | 8/1987 | European Pat. Off. | H04N 7/133 |
| 0322955    | 7/1989 | European Pat. Off. | H04N 7/00  |
| 63-109664  | 5/1988 | Japan              | H04N 1/415 |
| 232688     | 2/1990 | Japan              |            |
| 256187     | 2/1990 | Japan              |            |
| 2032688    | 2/1990 | Japan              | H04N 7/13  |
| 2105792    | 4/1990 | Japan              |            |

OTHER PUBLICATIONS

Ngan, King N. et al., "Adaptive Cosine Transform Coding of Images in Perceptual Domain", *IEEE Transactions on Acoustics, Speech and Signal Processing*, vol. 37 No. 11, Nov. 1989, New York, pp. 1743–1749.

Patent Abstracts of Japan, vol. 13, No. 558, Dec. 12, 1989.

Patent Abstracts of Japan, vol. 12, No. 124, Apr. 16, 1988.

Signal Processing of HDTV, Proceedings of The Second International Workshop on Signal Processing of HDTV, Feb. 1988, pp. 231–238.

IEEE, Transactions on Acoustics, Speech, and Signal Processing, vol. 37, No. 11, Nov. 1989.

"An experimental Digital VCR with 40 MM Drum, Single Actuator, and DCT-Based Bit-Rate Reduction", S. Borgers et al.; IEEE Transactions on Consumer Electronics, Aug. 1988.

"On Adaptive DCT Coding Techniques for Digital Video Recording" by P.H.N. De with and S.M.C. Borgers, IEEE Proc. 7th Int. Conference on video, audio and data recording (1988.3).

*Primary Examiner*—Howard W. Britton

[57] ABSTRACT

A video signal encoding apparatus in which the number of quantization bits used in a quantizing circuit is determined on the basis of the activity index of each video block and the length of coded data or alternatively on the basis of the activity index of each video block and the number of events (each event consisting of the zero run length and nonzero value of quantized data). The video signal is encoded in a compressed form after shuffling the video blocks in such a manner that, when attention is given to any given video block, its four neighboring video blocks belong to units different from the unit to which the attention video block belong. Compression encoding of the video blocks is performed in sequence starting with the center of the screen and then proceeding toward the sides of the screen.

7 Claims, 39 Drawing Sheets

Fig. 3

| 80 | 3 | 0 | 2 | 1 | 0 |  |  |
|----|---|---|---|---|---|--|--|
| 2  | 1 | -1| 0 |   |   |  |  |
| -1 | 0 | 1 |   |   |   |  |  |
| 1  | 0 |   |   |   |   |  |  |
| 0  |   |   |   |   |   |  |  |
|    |   |   |   |   |   |  |  |
|    |   |   |   |   |   |  |  |
|    |   |   |   |   |   |  |  |

Fig. 10

| ACTIVITY INDEX \ USE CONDITION OF BUFFER MEMORY 11 | i | ii | iii | iv | v |
|---|---|---|---|---|---|
| a ~ b | 9 | 8 | 8 | 7 | 7 |
| b ~ c | 8 | 8 | 7 | 7 | 6 |
| c ~ d | 8 | 7 | 7 | 6 | 6 |
| d ~ e | 7 | 7 | 6 | 6 | 6 |

Fig. 17

| ACTIVITY INDEX \ USE PREDICTION OF BUFFER MEMORY 11 | i | ii | iii | iv | v |
|---|---|---|---|---|---|
| a ~ b | 9 | 8 | 8 | 7 | 7 |
| b ~ c | 8 | 8 | 7 | 7 | 6 |
| c ~ d | 8 | 7 | 7 | 6 | 6 |
| d ~ e | 7 | 7 | 6 | 6 | 6 |

Fig. 26

| A1 | B1 | C1 | D1 | E1 | A2 | B2 | C2 | D2 | E2 | A3 | B3 |
|---|---|---|---|---|---|---|---|---|---|---|---|
| E19 | A19 | B19 | C19 | D19 | E20 | A20 | B20 | C20 | D20 | E21 | A21 |
| D37 | E37 | A37 | B37 | C37 | D38 | E38 | A38 | B38 | C38 | D39 | E39 |
| C55 | D55 | E55 | A55 | B55 | C56 | D56 | E56 | A56 | B56 | C57 | D57 |
| B73 | C73 | D73 | E73 | A73 | B74 | C74 | D74 | E74 | A74 | B75 | C75 |
| A91 | B91 | C91 | D91 | E91 | A92 | B92 | C92 | D92 | E92 | A93 | B93 |
| E109 | A109 | B109 | C109 | D109 | E110 | A110 | B110 | C110 | D110 | E111 | A111 | n PIXELS (vertical) × n PIXELS (horizontal)

Fig. 34

| C147 | E123 | B99  | D75 | A51 | C27 | E3 | D15 | B39 | E63 | C87 | A111 | D135 | B159 |
|------|------|------|-----|-----|-----|----|-----|-----|-----|-----|------|------|------|
| D145 | A121 | C97  | E73 | B49 | D25 | A1 | E13 | C37 | A61 | D85 | B109 | E133 | C157 |
| E145 | B121 | D97  | A73 | C49 | E25 | B1 | A13 | D37 | B61 | E85 | C109 | A133 | D157 |
| A145 | C121 | E97  | B73 | D49 | A25 | C1 | B13 | E37 | C61 | A85 | D109 | B133 | E157 |
| B145 | D121 | A97  | C73 | E49 | B25 | D1 | C13 | A37 | D61 | B85 | E109 | C133 | A157 |
| C145 | E121 | B97  | D73 | A49 | C25 | E1 | D13 | B37 | E61 | C85 | A109 | D133 | B157 |
| D146 | A122 | C98  | E74 | B50 | D26 | A2 | E14 | C38 | A62 | D86 | B110 | E134 | C158 |
| E146 | B122 | D98  | A74 | C50 | E26 | B2 | A14 | D38 | B62 | E86 | C110 | A134 | D158 |
| A146 | C122 | E98  | B74 | D50 | A26 | C2 | B14 | E38 | C62 | A86 | D110 | B134 | E158 |
| B146 | D122 | A98  | C74 | E50 | B26 | D2 | C14 | A38 | D62 | B86 | E110 | C134 | A158 |
| C146 | E122 | B98  | D74 | A50 | C26 | E2 | D14 | B38 | E62 | C86 | A110 | D134 | B158 |
| D148 | A124 | C100 | E76 | B52 | D28 | A4 | E16 | C40 | A64 | D88 | B112 | E136 | C160 |

Fig. 35

| C147 | E123 | B99  | D75 | A51 | C27 | E3 | C15 | A39 | D63 | B87 | E111 | C135 | A159 |
|------|------|------|-----|-----|-----|----|-----|-----|-----|-----|------|------|------|
| D145 | A121 | C97  | E73 | B49 | D25 | A1 | D13 | B37 | E61 | C85 | A109 | D133 | B157 |
| E145 | B121 | D97  | A73 | C49 | E25 | B1 | E13 | C37 | A61 | D85 | B109 | E133 | C157 |
| A145 | C121 | E97  | B73 | D49 | A25 | C1 | A13 | D37 | B61 | E85 | C109 | A133 | D157 |
| B145 | D121 | A97  | C73 | E49 | B25 | D1 | B13 | E37 | C61 | A85 | D109 | B133 | E157 |
| C145 | E121 | B97  | D73 | A49 | C25 | E1 | C13 | A37 | D61 | B85 | E109 | C133 | A157 |
| D146 | A122 | C98  | E74 | B50 | D26 | A2 | D14 | B38 | E62 | C86 | A110 | E134 | B158 |
| E146 | B122 | D98  | A74 | C50 | E26 | B2 | E14 | C38 | A62 | D86 | B110 | A134 | C158 |
| A146 | C122 | E98  | B74 | D50 | A26 | C2 | A14 | D38 | B62 | E86 | C110 | B134 | D158 |
| B146 | D122 | A98  | C74 | E50 | B26 | D2 | B14 | E38 | C62 | A86 | D110 | C134 | E158 |
| C146 | E122 | B98  | D74 | A50 | C26 | E2 | D14 | A38 | D62 | B86 | E110 | D134 | A158 |
| D148 | A124 | C100 | E76 | B52 | D28 | A4 | D16 | B40 | E64 | C88 | A112 | E136 | B160 |

Fig. 36

| B147 | E123 | C99 | A75 | D51 | B27 | E3 | C15 | A39 | D63 | B87 | E111 | C135 | A159 |
|------|------|-----|-----|-----|-----|----|-----|-----|-----|-----|------|------|------|
| C145 | A121 | D97 | B73 | E49 | C25 | A1 | D13 | B37 | E61 | C85 | A109 | D133 | B157 |
| D145 | B121 | E97 | C73 | A49 | D25 | B1 | E13 | C37 | A61 | D85 | B109 | E133 | C157 |
| E145 | C121 | A97 | D73 | B49 | E25 | C1 | A13 | D37 | B61 | E85 | C109 | A133 | D157 |
| A145 | D121 | B97 | E73 | C49 | A25 | D1 | B13 | E37 | C61 | A85 | D109 | B133 | E157 |
| B145 | E121 | C97 | A73 | D49 | B25 | E1 | C13 | A37 | D61 | B85 | E109 | C133 | A157 |
| C146 | A122 | D98 | B74 | E50 | C26 | A2 | D14 | B38 | E62 | C86 | A110 | D134 | B158 |
| D146 | B122 | E98 | C74 | A50 | D26 | B2 | E14 | C38 | A62 | D86 | B110 | E134 | C158 |
| E146 | C122 | A98 | D74 | B50 | E26 | C2 | A14 | D38 | B62 | E86 | C110 | A134 | D158 |
| A146 | D122 | B98 | E74 | C50 | A26 | D2 | B14 | E38 | C62 | A86 | D110 | B134 | E158 |
| B146 | E122 | C98 | A74 | D50 | B26 | E2 | C14 | A38 | D62 | B86 | E110 | C134 | A158 |
| C148 | A124 | D100 | B76 | E52 | C28 | A4 | D16 | B40 | E64 | C88 | A112 | D136 | B160 |

Fig. 37

| B145 | A121 | C97 | E73 | B49 | D25 | A1 | E13 | C37 | A61 | D85 | B109 | E133 | C157 |
|------|------|-----|-----|-----|-----|----|-----|-----|-----|-----|------|------|------|
| E145 | B121 | D97 | A73 | C49 | E25 | B1 | A13 | D37 | B61 | E85 | C109 | A133 | D157 |
| A145 | C121 | E97 | B73 | D49 | A25 | C1 | B13 | E37 | C61 | A85 | D109 | B133 | E157 |
| B145 | D121 | A97 | C73 | E49 | B25 | D1 | C13 | A37 | D61 | B85 | E109 | C133 | A157 |
| C145 | E121 | B97 | D73 | A49 | C25 | E1 | D13 | B37 | E61 | C85 | A109 | D133 | B157 |
| D146 | A122 | C98 | E74 | B50 | D26 | A2 | E14 | C38 | A62 | D86 | B110 | E134 | C158 |
| E146 | B122 | D98 | A74 | C50 | E26 | B2 | A14 | D38 | B62 | E86 | C110 | A134 | D158 |
| A146 | C122 | E98 | B74 | D50 | A26 | C2 | B14 | E38 | C62 | A86 | D110 | B134 | E158 |
| B146 | D122 | A98 | C74 | E50 | B26 | D2 | C14 | A38 | D62 | B86 | E110 | C134 | A158 |
| C146 | E122 | B98 | D74 | A50 | C26 | E2 | D14 | B38 | E62 | C86 | A110 | D134 | B158 |
| D147 | A124 | C99 | E75 | B51 | D27 | A3 | E15 | C38 | A63 | D87 | B111 | E135 | C159 |
| E147 | B124 | D99 | A75 | C51 | E27 | B3 | A15 | D38 | B63 | E87 | C111 | A135 | D159 |

Fig. 38

| J73 | A61 | C49 | E37 | G25 | J13 | A1 | K7 | H19 | F31 | D43 | B55 | K67 | H79 |
|---|---|---|---|---|---|---|---|---|---|---|---|---|---|
| K73 | B61 | D49 | F37 | H25 | K13 | B1 | A7 | J19 | G31 | E43 | C55 | A67 | J79 |
| A73 | C61 | E49 | G37 | J25 | A13 | C1 | B7 | K19 | H31 | F43 | D55 | B67 | K79 |
| B73 | D61 | F49 | H37 | K25 | B13 | D1 | C7 | A19 | J31 | G43 | E55 | C67 | A79 |
| C73 | E61 | G49 | J37 | A25 | C13 | E1 | D7 | B19 | K31 | H43 | F55 | D67 | B79 |
| D73 | F61 | H49 | K37 | B25 | D13 | F1 | E7 | C19 | A31 | J43 | G55 | E67 | C79 |
| E73 | G61 | J49 | A37 | C25 | E13 | G1 | F7 | D19 | B31 | K43 | H55 | F67 | D79 |
| F73 | H61 | K19 | B37 | D25 | F13 | H1 | G7 | E19 | C31 | A43 | J55 | G67 | E79 |
| G73 | J61 | A49 | C37 | E25 | G13 | J1 | H7 | F19 | D31 | B43 | K55 | H67 | F79 |
| H73 | K61 | B49 | D37 | F25 | H13 | K1 | J7 | G19 | E31 | C43 | A55 | J67 | G79 |
| J74 | A62 | C50 | E38 | G26 | J14 | A2 | K8 | H20 | F32 | D44 | B55 | K68 | H80 |
| K74 | B62 | D50 | F38 | H26 | K14 | B2 | A8 | J20 | G32 | E44 | C55 | A68 | J80 |

Fig. 39

| A241 | C201 | B161 | A121 | C81 | B41 | A1 | C21 | A61 | B101 | C141 | A181 | B221 | C261 |
|------|------|------|------|------|------|------|------|------|------|------|------|------|------|
| B241 | A201 | C161 | B121 | A81 | C41 | B1 | A21 | B61 | C101 | A141 | B181 | C221 | A261 |
| C241 | B201 | A161 | C121 | B81 | A41 | C1 | B21 | C61 | A101 | B141 | C181 | A221 | B261 |
| A242 | C202 | B162 | A122 | C82 | B42 | A2 | C22 | A62 | B102 | C142 | A182 | B222 | C262 |
| B242 | A202 | C162 | B122 | A82 | C42 | B2 | A22 | B62 | C102 | A142 | B182 | C222 | A262 |
| C242 | B202 | A162 | C122 | B82 | A42 | C2 | B22 | C62 | A102 | B142 | C182 | A222 | B262 |
| A243 | C203 | B163 | A123 | C83 | B43 | A3 | C23 | A63 | B103 | C143 | A183 | B223 | C263 |
| B243 | A203 | C163 | B123 | A83 | C43 | B3 | A23 | B63 | C103 | A143 | B183 | C223 | A263 |
| C243 | B203 | A163 | C123 | B83 | A43 | C3 | B23 | C63 | A103 | B143 | C183 | A223 | B263 |
| A244 | C204 | B164 | A124 | C84 | B44 | A4 | C24 | A64 | B104 | C144 | A184 | B224 | C264 |
| B244 | A204 | C164 | B124 | A84 | C44 | B4 | A24 | B64 | C104 | A144 | B184 | C224 | A264 |
| C244 | B204 | A164 | C124 | B84 | A44 | C4 | B24 | C64 | A104 | B144 | C184 | A224 | B264 |

VIDEO SIGNAL ENCODING APPARATUS

This application is a continuation of application Ser. No.: 07/820,913 filed on Jan. 15, 1992, now abandoned.

BACKGROUND OF THE INVENTION

1. Field of the Invention

The present invention relates to a video signal encoding apparatus for compressing and encoding a video signal by dividing it into blocks and performing an orthogonal transform on each block.

2. Description of the Prior Art

If video data converted to digital signals is directly recorded on tape or other recording medium, the volume of data will be so great that it will usually exceed the limit of the data amount that the recording medium can hold. Therefore, when recording a digital video signal on tape or other recording medium, it is necessary to compress it so that the data volume does not exceed the limit. To achieve this, it has been known to compress the video signal by using a high-efficiency encoding apparatus.

One example of such high-efficiency encoding that has been widely used is the orthogonal transform encoding method in which transform coefficients obtained by orthogonal-transforming the original signal are quantized for encoding. This method is known to provide high encoding efficiency. In encoding a video signal by this method, the video signal is first divided into blocks each consisting of n×n pixels (where n is an integer), an orthogonal transformation is performed on each block to transform it into a transform coefficient representing n×n frequency regions, and then the transform coefficient is quantized. However, when all blocks are quantized with the same number of bits, adequate image quality can be obtained for the video blocks in flat areas, but noise appears in the video blocks including edge areas since errors are dispersed in the vicinity of the edge areas.

An example of an encoding apparatus that overcomes the above problem is disclosed in Japan Patent Application Laid-Open No. 2-105792. FIG. 1 shows a block diagram of the encoding apparatus disclosed n the patent Publication. The encoding apparatus shown is described below with reference to FIG. 1. A video signal is inputted to a blocking circuit 51 where it is divided into blocks, each block then being supplied to an orthogonal transfroming circuit 52 for orthogonal transformation. The transform coefficient obtained by the orthogonal transformation is quantized by a quantizing circuit 53. The quantizing circuit 53 has the ability to perform quantization using a variable number of quantization bits. An edge area detecting circuit 54 is provided to detect the edges of the video signal, while a flat area detecting circuit 55 is provided to determine whether the block represents a flat area. Based on the outputs from the edge area detecting circuit 54 and the flat area detecting circuit 55, a block identifying circuit 56 determines whether the block includes an edge area as well as a flat area, the result of which is fed to the quantizing circuit 53 to determine the number of quantization bits. When the whole block is flat or when the whole block has a complicated structure, it is decided to use a smaller bit code for quantization since noise is not appreciably visible. On the other hand, if the block includes an edge area as well as a flat area, it is decided to use a higher bit code for quantization to prevent the generation of noise in the flat area. Thus, in the encoding apparatus disclosed in the above Patent Publication, in order to overcome the aforementioned problem, the transform coefficients for blocks including both edge and flat areas are quantized using a higher bit code to reduce the noise and thereby improve the image quality after decoding. The determining factors used to detect the edge or flat areas in a block include a variance within the block, the maximum value of the block, the dynamic range of the block, etc. These factors are collectively referred to as the activity index. In the above prior art encoding apparatus, the number of quantization bits (quantization level) is selected for each block on the basis of the activity index.

The output of the quantizing circuit 53 of FIG. 1 is encoded, usually using entropy encoding such as Huffman encoding, into a variable-length code for transmission. The bit length of one block after variable-length encoding varies from block to block, and in the case of a recording medium such as a helical scan digital video tape recorder (VTR) having a fixed track length, it is convenient to grasp the number of data blocks to be recorded per track. Therefore, it is a usual practice to predetermine at least the number of data blocks to be recorded per track. Also, when block correcting codes (e.g., BCH codes, Reed-Solomon codes, etc.) are employed as error-correcting codes, it may be practiced to fix the data length of variable-length code for each error-correcting block. Usually, when encoding video signals, one field or frame is divided into N segments (where N is an integer), each segment serving as a unit, and the maximum data amount is set for each of the N units.

However, in a channel, such as a digital VTR, in which the data length for the variable-length codes is fixed, the data length of variable-length code may vary from code to code after variable-length encoding depending on the kind of the image processed, and the total code length after variable-length encoding may exceed the fixed length of the channel, resulting in an overflow. If this happens, the transmission will be cut off because of dataflow, and therefore, not only overflown data but also the subsequent data will not be transmitted. This presents the problem of an inability to correctly perform the decoding of the original signal.

Variable-length encoding of a television image is usually performed in sequence from left to right and from top to bottom of the television screen. Therefore, the problem is that the above-mentioned cutoff is likely to occur in the center of the television screen where the feature elements of the image are contained.

SUMMARY OF THE INVENTION

An object of the invention is to provide a video signal encoding apparatus that is capable of fixing the encoded data length to a predetermined length without causing degradation in image quality at the decoding side.

Another object of the invention is to provide a video signal encoding apparatus wherein distortions resulting from transmission cutoffs are not easily visible even when the code length of the data to be transmitted is fixed.

In one embodiment of the video signal encoding apparatus of the invention, encoded data is stored in a buffer memory having the capacity that can store, for example, the amount of data corresponding to the data length of one track, and the encoding process is controlled on the basis of the remaining space in the buffer memory. Encoding is performed in sequence starting from the center and proceeding toward the sides of the television screen.

In another embodiment of the video signal encoding apparatus of the invention, the number of quantization bits is decided on the basis of the activity index of each block and the data length after encoding. In such a case, the least significant bit of the data quantized using a bit code higher by one bit than the predetermined one is also encoded, and if the transmission amount permits, this encoded data is also transmitted. Alternatively, the number of quantization bits is decided on the basis of the activity index of each block and the number of events (the zero run length and nonzero value of quantized data constitute an occurrence of one event).

In still another embodiment of the video signal encoding apparatus of the invention, each block is shuffled so that an attention block belongs to a unit different from the units to which its four neighboring blocks belong, after which compression encoding is performed. Within each unit, compression encoding is performed first on the blocks nearer to the center of the screen and then on the block nearer to the sides of the screen.

The above and further objects and features of the invention will more fully be apparent from the following detailed description with accompanying drawings.

BRIEF DESCRIPTION OF THE DRAWINGS

FIG. 3 is a diagram showing an example of encoding during the process.

FIG. 10 is a diagram showing a table of bit code selection for quantization in accordance with the third embodiment.

FIG. 17 is a diagram showing a table of bit code selection for quantization in accordance with the fourth embodiment.

FIG. 26 is a diagram explaining the operation of shuffling in the fifth embodiment.

FIG. 34 is a diagram showing an example of shuffling in the sixth embodiment.

FIG. 35 is a diagram showing another example of shuffling in the sixth embodiment.

FIG. 36 is a diagram showing still another example of shuffling in the sixth embodiment.

FIG. 37 is a diagram showing yet another example of shuffling in the sixth embodiment.

FIG. 38 is a diagram showing a further example of shuffling in the sixth embodiment.

FIG. 39 is a diagram showing a still further example of shuffling in the sixth embodiment.

DESCRIPTION OF THE PREFERRED EMBODIMENTS

The preferred embodiments of the present invention will now be described with reference to the accompanying drawings.

Embodiment 1

In the first embodiment of the invention, variable-length coded data is stored in a buffer memory, and the remaining capacity of the buffer memory is monitored for a possible occurrence of excess data, the result of which is fed back for variable-length encoding control.

Figure 1:
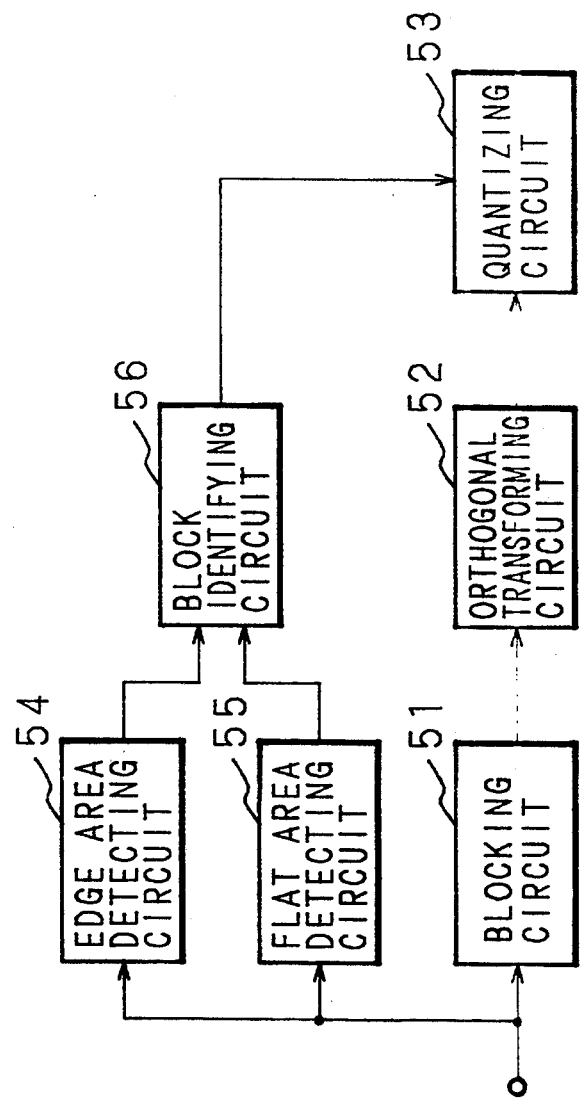
FIG. 1 is a diagram showing the configuration of a prior art video signal encoding apparatus.
Figure 2:
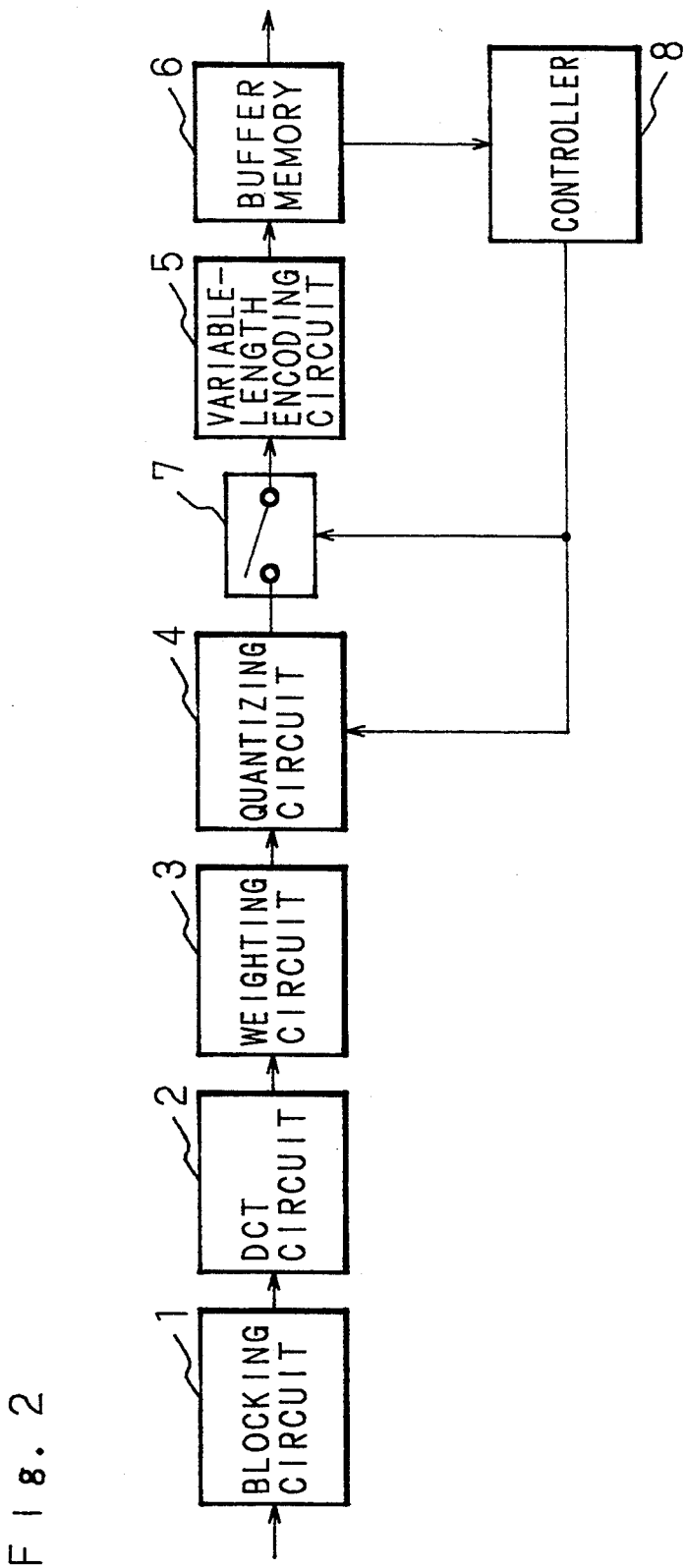
FIG. 2 is a diagram showing the configuration of a video signal encoding apparatus in accordance with a first embodiment of the invention.

FIG. 2 is a block diagram showing the configuration of the first embodiment. In the figure, the reference numeral 1 indicates a blocking circuit for dividing the input digital video signal into blocks each consisting of plurality of pixels. Each block is fed from the blocking circuit 1 to a DCT circuit 2. The DCT circuit 2 performs a discrete cosine transform (DCT) on each block and supplies the obtained transform coefficient (DCT coefficient) to a weighting circuit 3. The weighting circuit 3 performs a weighting for each DCT coefficient and supplies the weighted DCT coefficient to a quantizing circuit 4. The quantizing circuit 4 quantizes the weighted DCT coefficient with the number of quantization bits determined by a controller 8, and supplies the quantized DCT coefficient to a variable-length encoding circuit 5 through a switch 7. The variable-length encoding circuit 5 encodes the quantized DCT coefficient into a variable-length code and transfers the variable-length encoded data to a buffer memory 6. The buffer memory 6 is constructed from a RAM or the like and has the storage capacity equivalent to the data length of one track. The switch 7 turns on and off the data input to the variable-length circuit 5. The controller 8 controls the number of quantization bits for the quantizing circuit 4, as well as the switching operation of the switch 7, on the basis of the amount of data stored in the buffer memory 6.

The operation will now be described.

Figure 3:
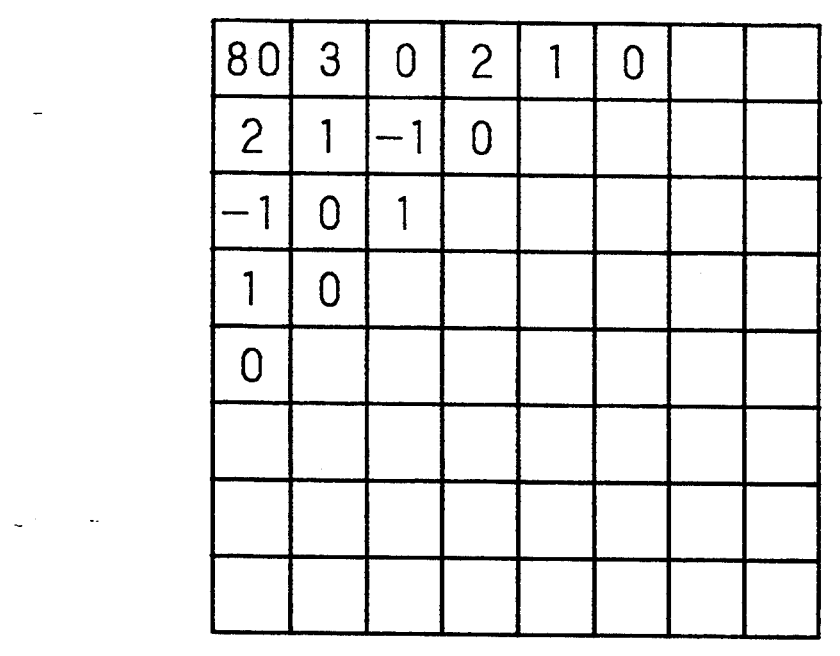
Figure 4:
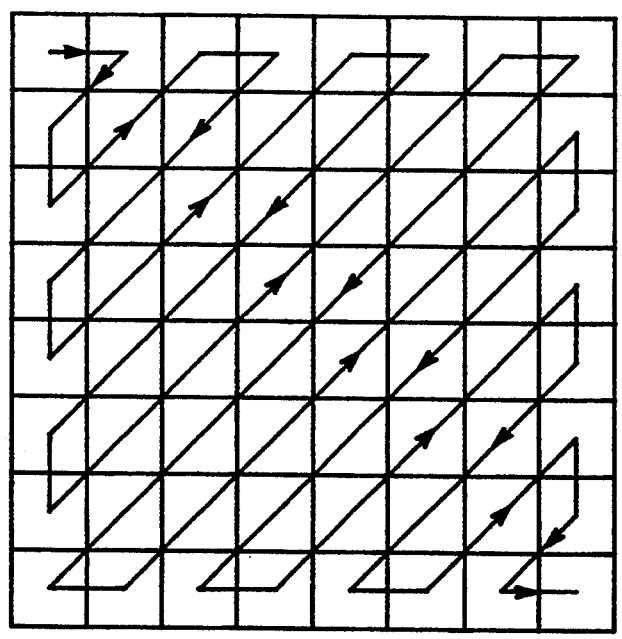
FIG. 4 is a diagram showing the scanning sequence during encoding.

The data obtained by sampling the video signal is divided by the blocking circuit 1 into blocks each consisting of, for example, eight pixels in both horizontal and vertical directions. The DCT circuit 2 performs a DCT on each block, and the obtained DCT coefficient is then weighted by the weighting circuit 3. At this time, the weighting is performed so that weighting factors for DCT coefficients in higher frequency regions will be smaller values. This is because the visual resolution drops for higher frequency regions, allowing high-efficiency encoding without noticeable degradation. Next, the weighted DCT coefficient is quantized by the quantizing circuit 4. Quantized n-bit data may be expressed as shown in FIG. 3, for example. This data is encoded by the variable-length encoding circuit 5 into a variable-length code by performing one-dimensional scanning as shown in FIG. 4. The variable-length encoding circuit 5 is a circuit for encoding data into a code whose length depends, for example, on the string of zeros (zero run length) and nonzero value, and usually, the Huffman encoding and like methods are widely used. The output of the variable-length encoding circuit 5 is stored in the buffer memory 6 for transfer to the transmission channel.

However, the length of the variable-length code outputted from the variable-length encoding circuit 5 varies according to the image pattern and, depending on the situation, may exceed or may not reach the maximum transmissible code length. The controller 8 predicts an occurrence of excess data by comparing the address value being written in the buffer memory 6 with the limit data length, and outputs signals to control the number of quantization bits for the quantizing circuit 4 and the switching operation of the switch 7.

Therefore, even if the data volume instantaneously increases at a particular portion of the image on the television screen, the buffer memory 6 can provide a sufficient capacity for data storage, and there arises no situation that results in an overflow or that causes the controller 8 to direct transmission cutoff.

Figure 5:
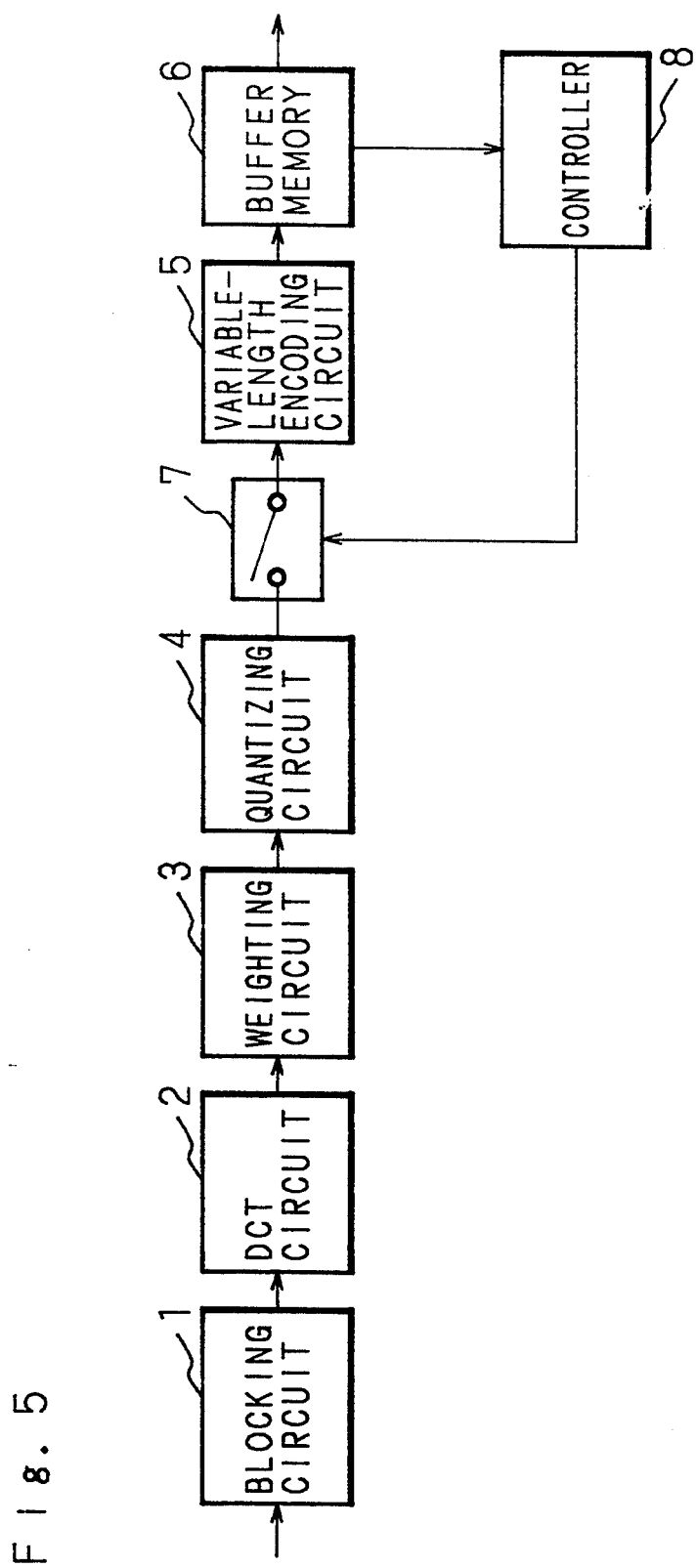
FIG. 5 is a diagram showing an alternative configuration of the first embodiment.

FIG. 5 is a block diagram showing an alternative configuration of the first embodiment. In this alternative configuration, the controller 8 controls only the switching operation of the switch 7.

Embodiment 2

The second embodiment is essentially the same as the foregoing first embodiment, except that the encoding of image data is performed starting preferentially from the center of the television screen.

Figure 6:
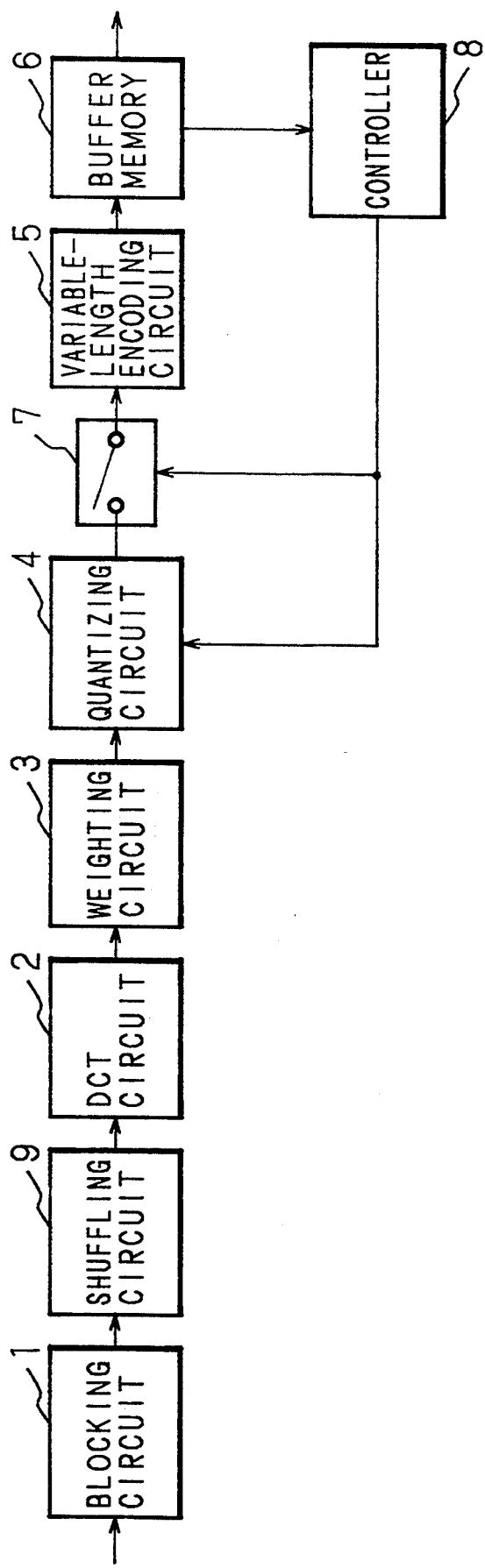
FIG. 6 is a diagram showing the configuration of a video signal encoding apparatus in accordance with a second embodiment of the invention.

FIG. 6 is a block diagram showing the configuration of the second embodiment, the reference numerals designating corresponding parts being the same as those in FIG. 2. In the second embodiment, there is provided between the blocking circuit 1 and the DCT circuit 2 a shuffling circuit 9 by which the blocks entered from the blocking circuit 1 are shuffled so that the encoding of image data is performed starting preferentially from the center of the television screen, thus shuffled blocks are supplied to the DCT circuit 2.

FIG. 7 shows the shuffling sequences performed by the shuffling circuit 9. FIG. 7(a) shows an example in which the shuffling is performed in such a manner as to spiral outward from the center of the screen. FIG. 7(b) shows an example in which the shuffling is performed in the vertical direction across the screen starting from the center and alternately moving toward both ends of the screen. Furthermore, FIG. 7(c) shows an example in which the shuffling is performed in the horizontal direction across the screen starting from the center and moving alternately toward the top and bottom of the screen.

Thus, in the second embodiment, the encoding is performed starting preferentially from the center of the screen, and therefore, if data transmission is cut off because of an occurrence of excess data, since the cutoff occurs in an edge portion of the screen, the distortion resulting from the cutoff is less visible.

Figure 7A:
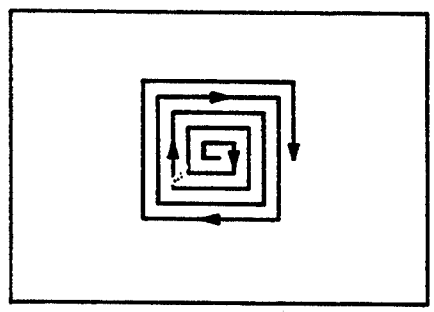
FIG. 7 is a series of diagrams showing in a specific manner the transmission sequences determined by the shuffling circuit shown in FIG. 6.
Figure 7B:
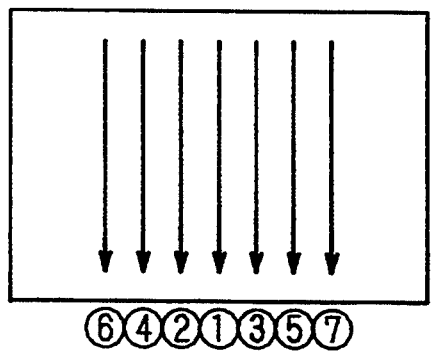
Figure 7C:
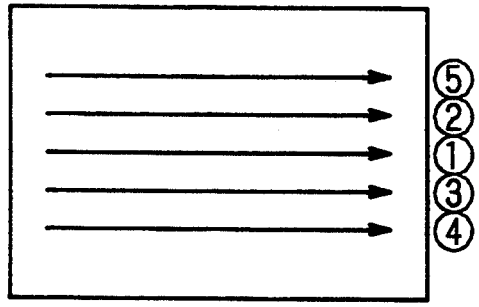
Figure 7D:
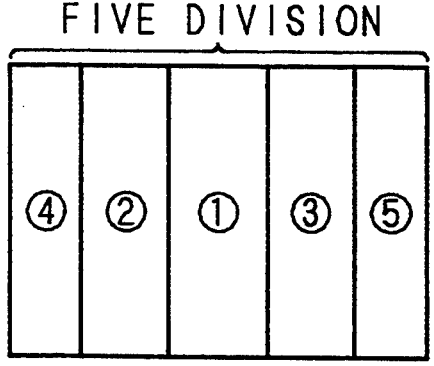

The shuffling sequences performed by the shuffling circuit 9 are not limited to the methods shown in FIGS. 7(a), (b), and (c), but instead, random numbers may be used. For example, the television screen may be divided into five sections, as shown in FIG. 7(d), and the shuffling sequence within each section may be determined by random numbers, starting from the center section and moving alternately toward both sides of the screen.

Figure 8:
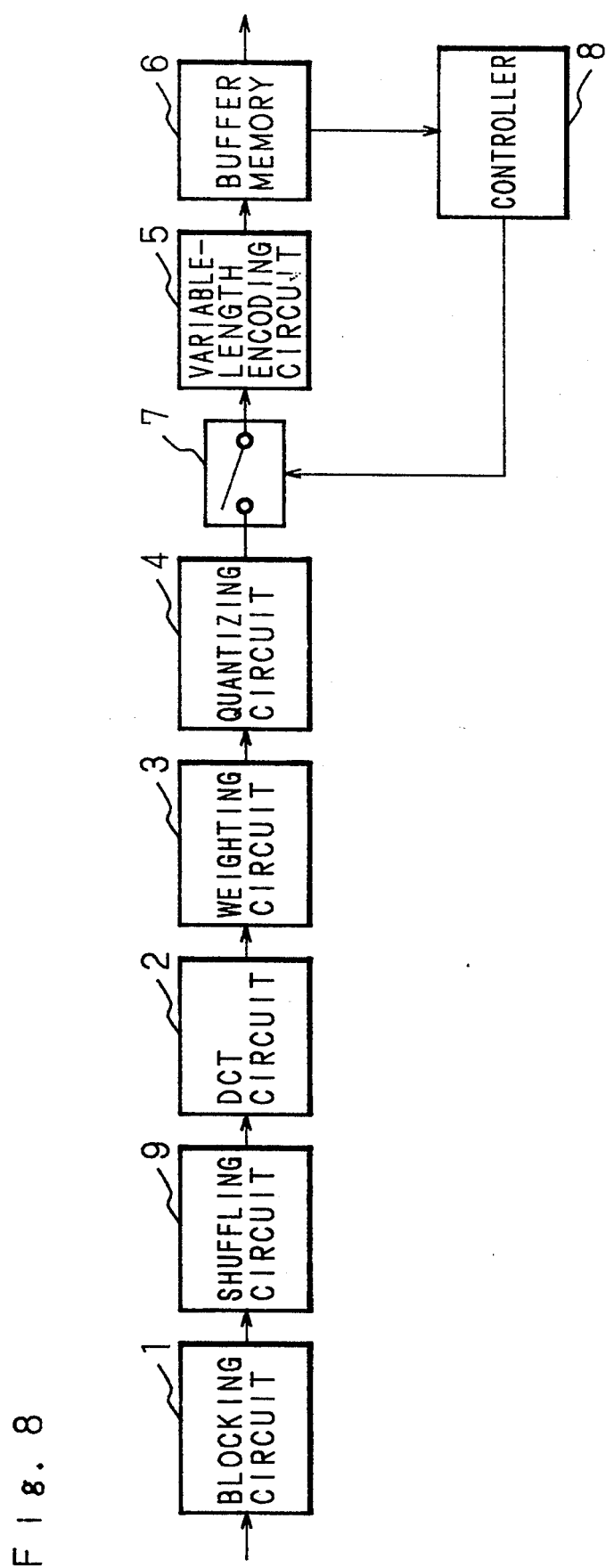
FIG. 8 is a diagram showing an alternative configuration of the second embodiment.

FIG. 8 is a block diagram showing an alternative configuration of the second embodiment. In this alternative configuration, the controller 8 controls only the switching operation of the switch 7.

Embodiment 3

The following describes the third embodiment in which the number of quantization bits for the quantizing circuit is determined on the basis of the activity index of each block and the data length after variable-length encoding.

Figure 9:
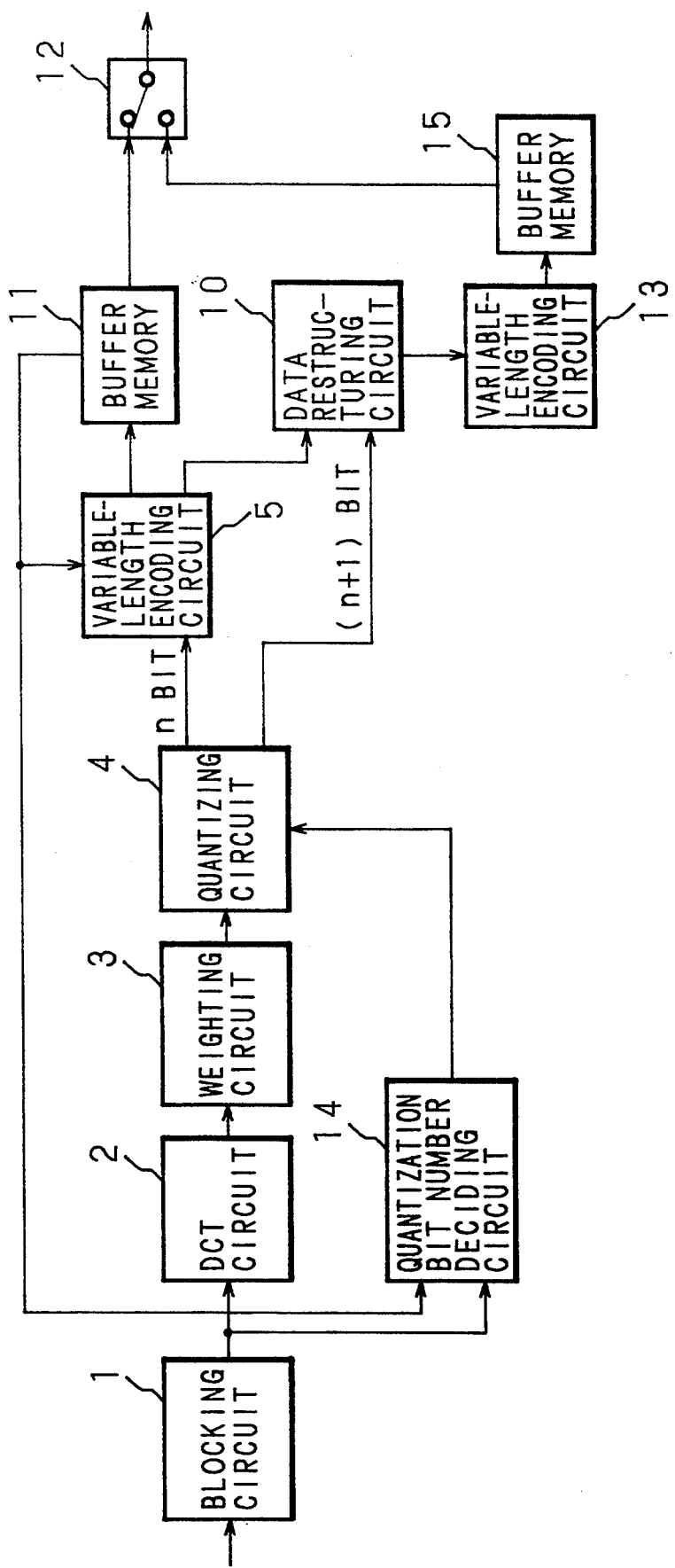
FIG. 9 is a diagram showing the configuration of a video signal encoding apparatus in accordance with a third embodiment of the invention.

FIG. 9 is a block diagram showing the configuration of the third embodiment, wherein the same reference numerals as those in FIG. 2 refer to the same or corresponding parts for which the description is omitted herein. The quantizing circuit 4 quantizes the weighted DCT coefficient with the number of quantization bits decided by a quantization bit number deciding circuit 14 and supplies the quantized DCT coefficient to the variable-length encoding circuit 5. The quantizing circuit 4 also quantizes the weighted DCT coefficient using a bit code higher by one bit than that decided by the quantization bit number deciding circuit 14 and supplies the quantized DCT coefficient to a data restructuring circuit 10. The variable-length encoding circuit 5 encodes the quantized DCT coefficient into a variable-length code, the variable-length code data then being transferred to a buffer memory 11 constructed from a RAM or the like. The variable-length encoding circuit 5 also supplies data, which has been unable to be variable-length encoded because of the possibility of overflow, to the data restructuring circuit 10. The data restructuring circuit 10 restructures the data from the variable-length encoding circuit 5 and the data from the quantizing circuit 4 and supplies the restructured data to a variable-length encoding circuit 13. The variable-length encoding circuit 13 encodes the input data into a variable-length code for transfer to a buffer memory 15 constructed from a RAM or the like. A switch 12 selects data output between the buffer memories 11 and 15.

The operation will now be described.

The basic operations of the blocking circuit 1, DCT circuit 2, weighting circuit 3, quantizing circuit 4, and variable-length encoding circuit 5 are the same as those described in the aforementioned first embodiment, and therefore, the description of their operations is omitted herein.

The length of the variable-length code outputted from the variable-length encoding circuit 5 varies according to the image pattern and, depending on the situation, may exceed or may not reach the maximum transmissible code length. To avoid this, the quantization bit number deciding circuit 14 decides the number of quantization bits in such a manner that the number of quantization bits is reduced (to reduce the quantization level) as the buffer memory 11 nears its full capacity.

In the prior art, the number of quantization bits is decided only on the basis of the activity index of the image, but in the third embodiment of this invention, the number of quantization bits is decided considering not only the activity index but also the memory usage in the buffer memory 11. After all the blocks to be transmitted have been encoded, the variable-length encoded data is transferred from the buffer memory 11 to the transmission channel. Since the number of quantization bits is decided considering not only the activity index but also the code amount of coded blocks, as described above, this embodiment provides good control against data overflow.

An example of quantization bit code selection is shown in FIG. 10. In FIG. 10, the memory usage in the buffer memory 11 and the activity index are taken as the deciding factors, but it will be appreciated that the average code length per block, i.e. the result obtained by dividing the used space in the buffer memory 11 by the number of DCT'ed and variable-length encoded blocks, may be included as a deciding factor. Thus, since the number of quantization bits is reduced as the buffer memory 11 nears its full capacity, the probability increases that the post-quantization value will become zero. As a result, the length of a variable-length code per pixel decreases. In this manner, the code length becomes shorter as the buffer memory 11 nears its full capacity, thus providing effective control against data overflow.

Figure 11:
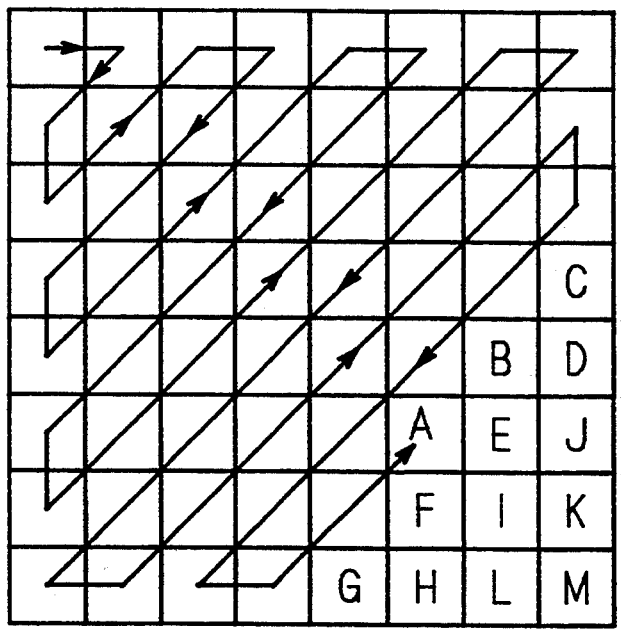
FIG. 11 is a diagram showing a data cutoff during encoding.

Also, when the situation has reached or is expected to reach the critical point at which an overflow occurs, the variable-length encoding may be cut off, for example, at point A on the higher frequency side, as shown in FIG. 11.

As described above, the overflow control of the buffer memory 11 is executed. On the other hand, the code length may not reach the maximum transmissible code length depending on the kind, e.g., the pattern, of the image, as earlier noted. In this case, encoding is performed to add encoded data up to the transmissible limit. The operation for this is described below.

When it is determined by the quantization bit number deciding circuit 14 that a weighted DCT coefficient should be quantized with n bits, the quantizing circuit 4 quantizes the DCT coefficient with n bits and also with (n+1) bits. The least significant bit quantized with (n+1) bits will not be encoded by the variable-length encoding circuit 5, but can be transferred for use in decoding to improve the signal-to-noise ratio after the decoding. That is, when there remains available space on the transmission channel, data for improvement of image quality is added and transmitted. In FIG. 9, the quantizing circuit 4 outputs the (n+1)th bit to the data restructuring circuit 10 which is the least significant bit when the coefficient is quantized with (n+1) bits. Basically, this bit should be encoded into a variable-length code. The least significant bit is encoded by the variable-length encoding circuit 13 into a variable-length code.

By doing this, when the code length after variable-length encoding does not reach the maximum transmissible length, the data quantized with a one-bit higher resolution can be added for transmission, thereby enabling the image to be encoded with a higher quality for the same transmission rate.

The data B to M which have not been encoded by the variable-length encoding circuit 5, as shown in FIG. 11, are entered from the variable-length encoding circuit 5 to the data restructuring circuit 10. Accordingly, the cutoff as shown in FIG. 11 tends to cause a distoration. Therefore, in the third embodiment, the data thus cut off are encoded and stored temporarily so that this data can be added when, ultimately, there remains space on the transmission channel. This serves to reduce the adverse effect related to the cutoff in FIG. 11 which tends to cause a distortion. In this case, the data for which the encoding by the variable-length encoding circuit 5 has been cut off should be encoded by the variable-length encoding circuit 13 with the other data not cut off being rendered zero. In this case, it will be useful to add as information the address of each block that has been cut off.

In the data restructuring circuit 10, the data for which the variable-length encoding has been cut off and the least significant bit when quantized with (n+1) bits are restructured as data, and the restructured data is supplied to the variable-length encoding circuit 13. The data restructuring circuit 10 restructures data with the data B-M unchanged, i.e. the data for which the encoding by the variable-length encoding circuit 5 has been cut off as shown in FIG. 11, with the other data being redered zero, and with the (n+1)th bit data quantized by the quantizing circuit 4 being added to the least significant bit of the data. The output of the data restructuring circuit 10 is inputted to the variable-length encoding circuit 13.

Since the least significant bit data quantized using an extra bit and the data cut off as a result of overflow control are thus restructured, data relating to image quality degradation can be preferentially encoded into a variable-length code and transmitted to improve the signal-to-noise ratio after decoding.

Since the data distribution of the input data to the variable-length encoding circuit 5 is different from that of the input data to the variable-length encoding circuit 13, designing suitable code cables for the respective circuits will serve to lower entropy and improve the encoding efficiency for high-efficiency encoding. When the (n+1)th bit data is added, since the nonzero value is always 1, only the zero run length should be encoded. Encoding only the zero run length into a variable-length code serves to improve the encoding efficiency in particular. Using the same code table for both encoding circuits would be advantageous in terms of hardware configuration but would decrease the encoding efficiency.

Using different code tables between the variable-length encoding circuits 5 and 13, as described above, makes it possible to enhance the encoding efficiency for high-efficiency encoding.

The restructured data is encoded by the variable-length encoding circuit 13 into a variable-length code which is then transferred for storage in the buffer memory 15. After data from the buffer memory 11 has been surely transmitted, if the code amount still has not been reached the transmissible limit, the switch 12 is then switched to the buffer memory 15 side to transmit data from the buffer memory 15 in serial by time-multiplexing. What should be noted here is that while all data in the buffer memory 11 is outputted to the transmission channel, all data in the buffer memory 15 may not necessarily be transmitted; the switch 12 operates in such a manner as to transmit data from the buffer memory 15 just enough to fill the vacancy. Thus, the variable-length encoded data can be transmitted effectively utilizing the transmissible amount up to the limit.

In the above configured video signal encoding apparatus, the data that is desirable for transmission in addition to the variable-length encoded data includes the block addresses of DCT blocks, the information representing n number of quantization bits, and the block addresses of the blocks for which the encoding has been cut off as shown in FIG. 11. Among these additional data, the information representing the number, n, of quantization bits is definitely required for decoding.

Therefore, at the encoder side, only the information representing the number, n, of quantization bits is added to the output of the variable-length encoding circuit 5 and stored in the buffer memory 11 for transfer to the transmission line. When the number, n, of quantization bits is transmitted, it is possible to know at the decoder side that the output of the variable-length circuit 13, which is additional data, is presented for the (n+1)th bit data.

Figure 12:
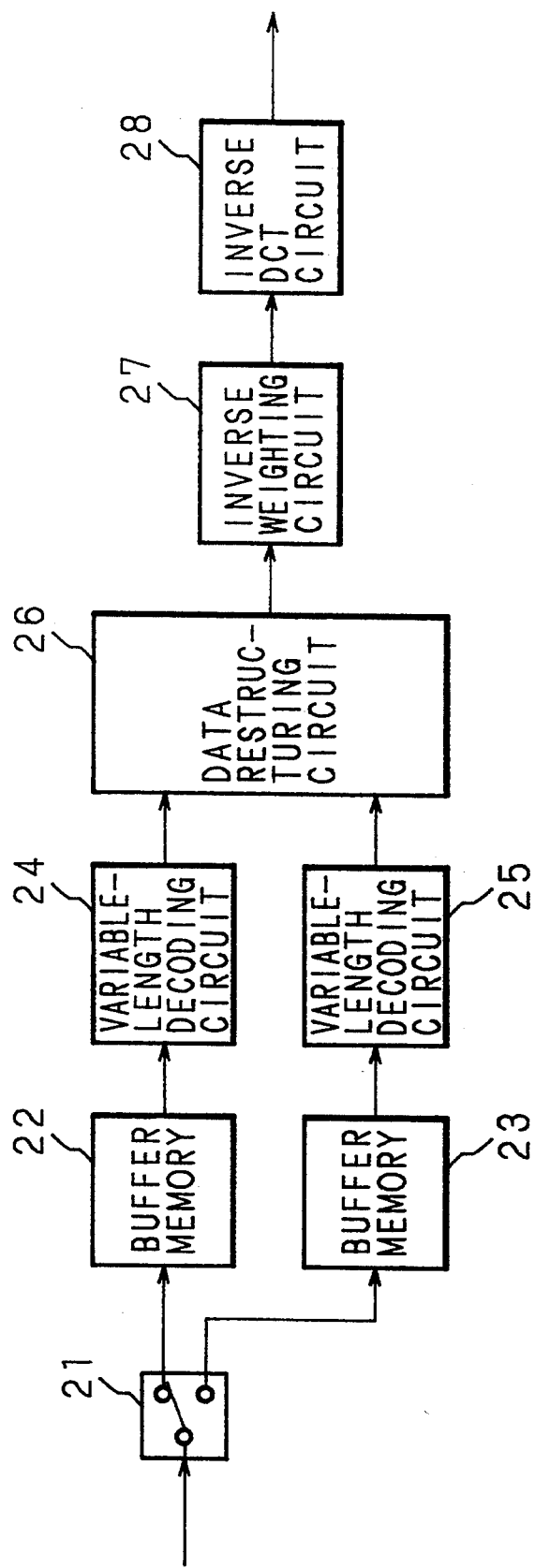
FIG. 12 is a diagram showing the configuration of a decoding system.

FIG. 12 is a diagram showing the configuration of a decoding system. In FIG. 12, the reference numeral 21 designates a switch for dividing time-multiplexed data. The variable-length encoded data thus divided are respectively inputted to buffer memories 22 and 23 for storage therein. The variable-length encoded data read out of the buffer memories 22 and 23 are respectively decoded by variable-length decoding circuits 24 and 25, and the original weighted DCT coefficients are supplied to a data restructuring circuit 26. The data restructuring circuit 26 restructures data which is then supplied to an inverse weighting circuit 27. Since the information representing the number, n, of quantization bits is added, the restructured data can be supplied to the inverse weighting circuit 27 after restructuring. The inverse weighting circuit 27 performs an inverse weighting and an inverse DCT circuit 28 performs an inverse DCT, thereby obtaining the original block video signal. In FIG. 12, the positions of the buffer memory 22 (23) and the variable-length encoding circuit 24 (25) may be exchanged, but with the configuration shown in FIG. 12, the buffer memory 24 (25) can be constructed with a smaller capacity memory since it stores variable-length encoded data after compression. The data restructuring circuit 26 is disposed on the upstream side of the inverse weighting circuit 27 and the inverse DCT circuit 28, but may be placed at another position. For example, the data restructuring circuit 26 may be placed on the downstream side of the inverse DCT circuit, in which case data restructuring is performed after performing the inverse weighting and the inverse DCT on each data.

Figure 13:
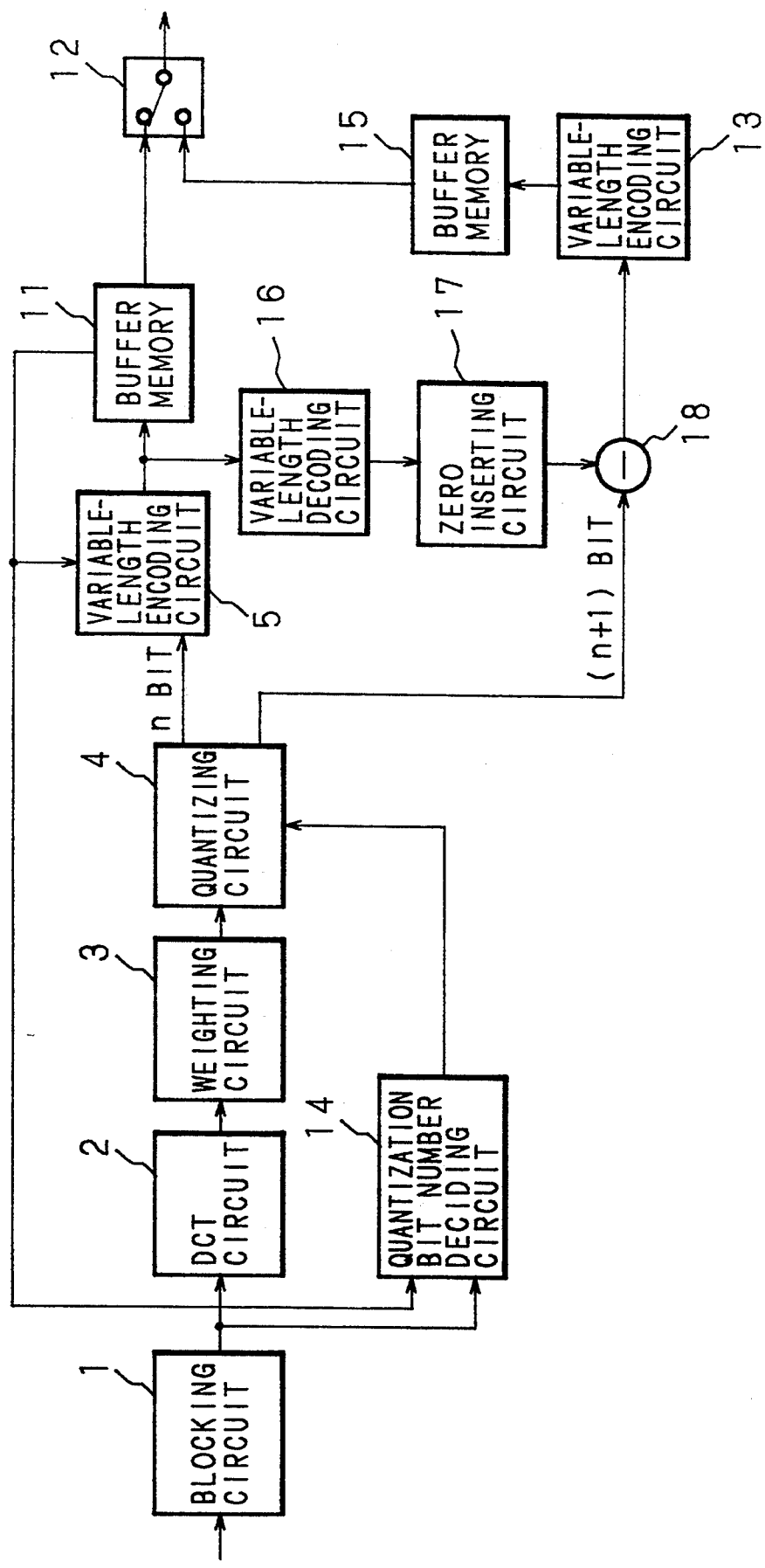
FIG. 13 is a diagram showing an alternative configuration of the third embodiment.

FIG. 13 is a block diagram showing an alternative configuration of the third embodiment. In FIG. 13, the same reference numeral as those in FIG. 9 refer to the same parts. In this configuration, the data restructuring circuit comprises a variable-length decoding circuit 16 for variable-length decoding the output of the variable-length encoding circuit 5, a zero inserting circuit 17 for inserting zero data into the output of the variable-length decoding circuit 16, and a subtracter 18 for subtracting the output of the zero inserting circuit 17 from the (n+1) bit data supplied from the quantizing circuit 4 and outputting the result of the subtraction to the variable-length encoding circuit 13. In this case, it will be convenient if the quantizing circuit 4 is so configured as to output two results, one quantized with n bits and the other with (n+1) bits.

Figure 14:
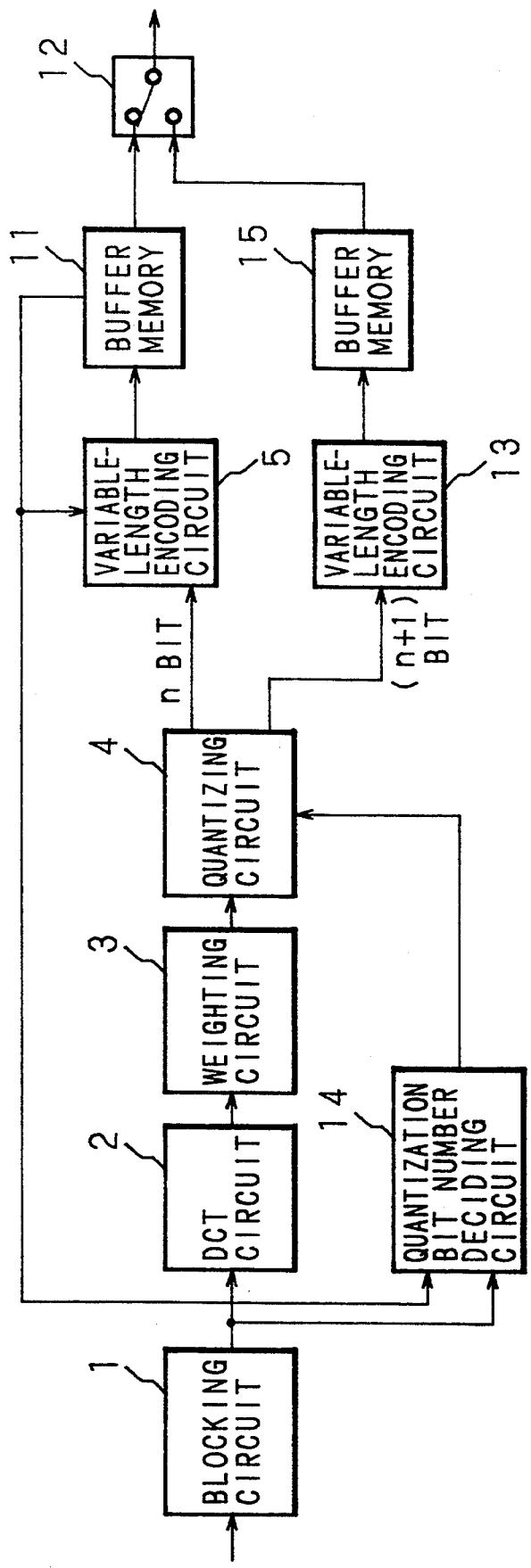
FIG. 14 is a diagram showing another alternative configuration of the third embodiment.

FIG. 14 is a block diagram showing another alternative configuration of the third embodiment. In FIG. 14, the same reference numerals as those in FIG. 9 refer to the same parts. In this configuration, data quantized with (n+1) bits is fed from the quantizing circuit 4 directly to the variable-length encoding circuit 13 for variable-length encoding.

Figure 15:
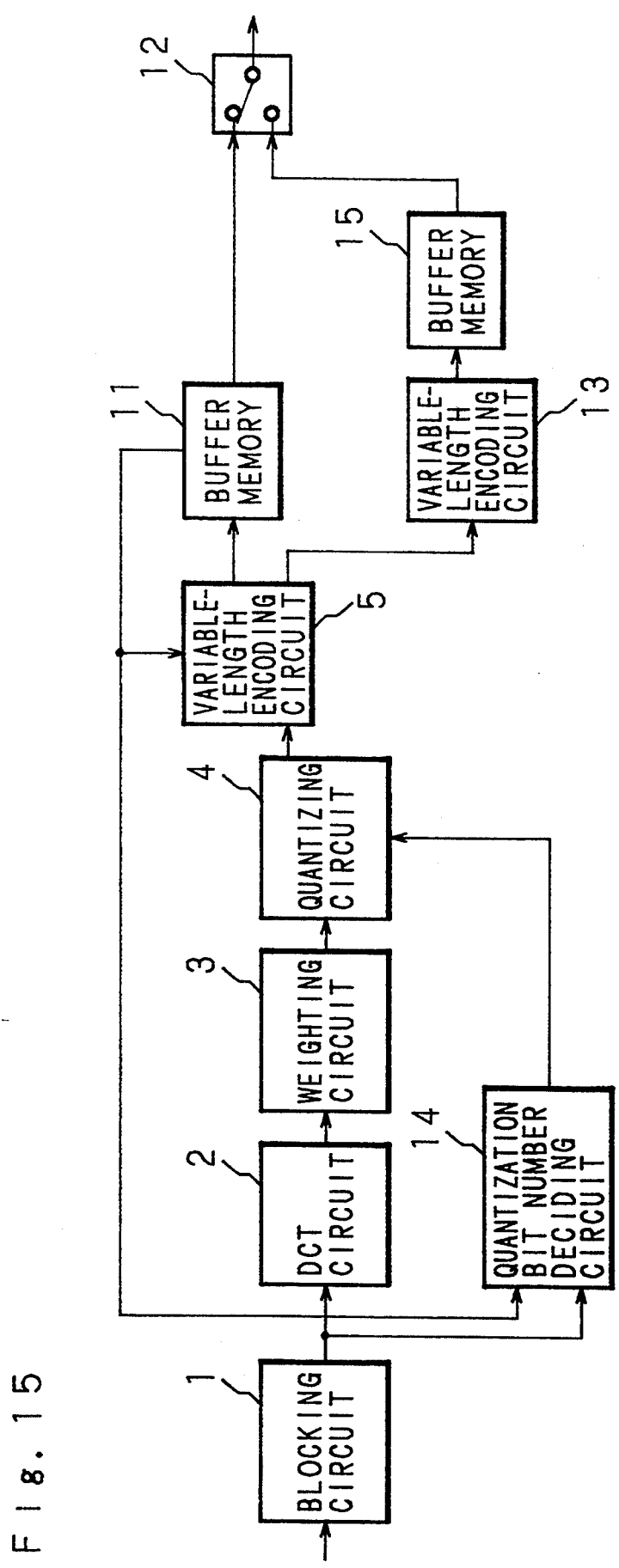
FIG. 15 is a diagram showing still another alternative configuration of the third embodiment.

FIG. 15 shows a block diagram of a further alternative configuration of the third embodiment. In FIG. 15, the same reference numerals as those in FIG. 9 refer to the same parts. In this configuration, data that has not been encoded by the variable-length encoding circuit 5 is fed from the variable-length encoding circuit 5 directly to the variable-length encoding circuit 13 for variable-length encoding.

In the above third embodiment, pre-DCT data and the memory usage in the buffer memory 11 are inputted to the quantization bit number deciding circuit 14 for deciding the number, n, of quantization bits, the number of quantization bits being decided by calculating the activity index of the image from the pre-DCT data and referencing the memory usage in the buffer memory 11 and the average code length per block. It will be appreciated that post-DCT data may also be referenced to decide the number of quantization bits in order to provide further accurate control of the code amount. Furthermore, the number of quantization bits used may be changed between the luminance signal and the chrominance signal.

Embodiment 4

The following describes the fourth embodiment in which the number of quantization bits is decided on the basis of the activity index of each block and the number of event occurrences. Variable-length encoding means assigning codes of varying lengths according to data occurrence. When the data count is increased (i.e. when tens of thousands to hundreds of thousands of codes are viewed), the bias in the code amount decreases. Further, when tens of thousands to hundreds of thousands of codes are viewed, it has been confirmed by simulation that the average code length per event (one event means one occurrence of zero run length and nonzero value) is stable approximately between 5 to 7 bits. Using this property the other way around, the entire code amount can be predicted fairly accurately by counting the number of events. The fourth embodiment uses such property of variable-length codes to predict the code amount and decide the number of quantization bits based on the predicted value.

Figure 16:
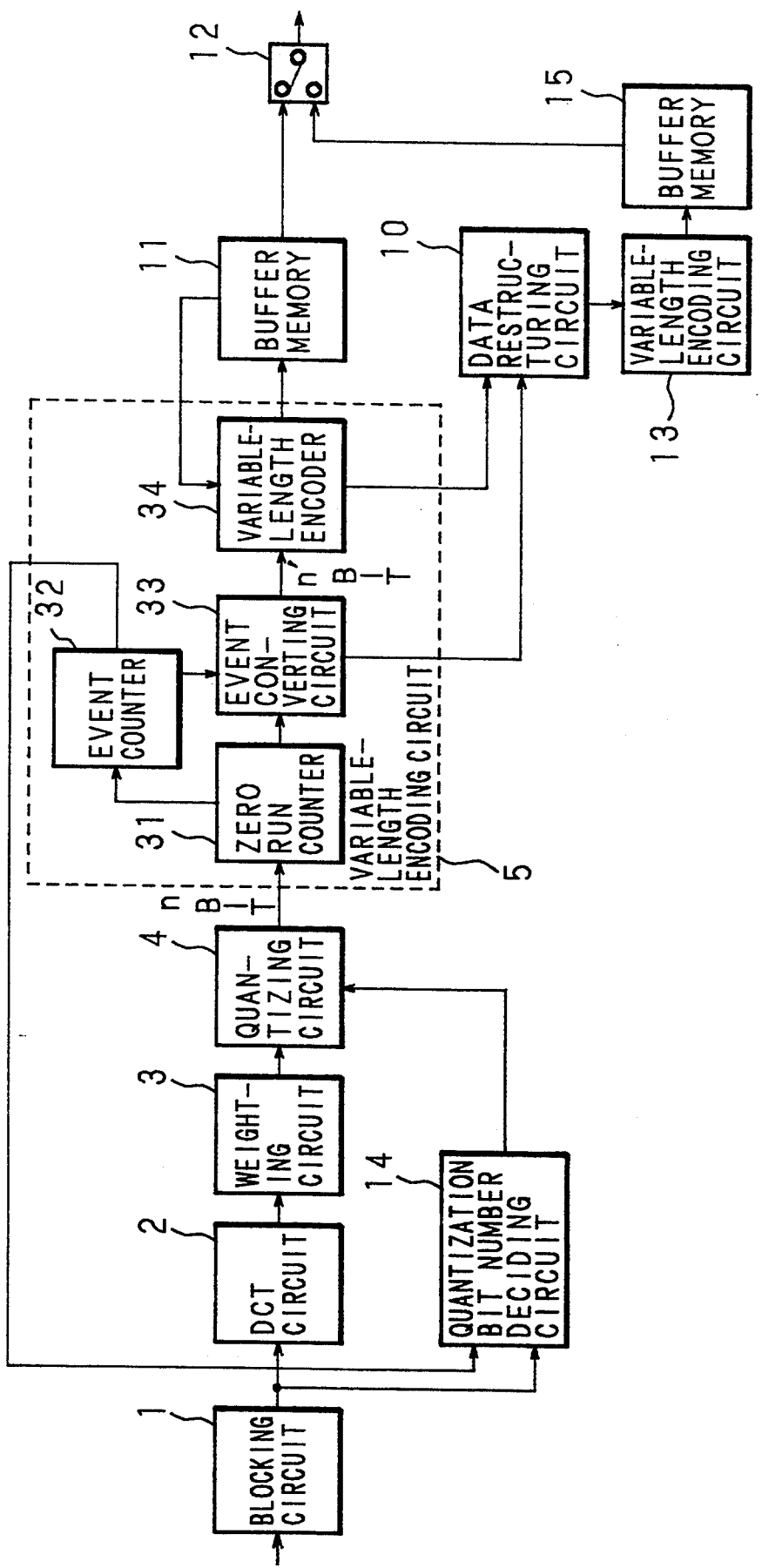
FIG. 16 is a diagram showing the configuration of a video signal encoding apparatus of a fourth embodiment.

FIG. 16 is a block diagram showing the configuration of the fourth embodiment, wherein the same numerals as those in FIG. 9 refer to the same or corresponding parts for which the description is omitted herein. The variable-length encoding 5 comprises a zero run counter 31 for counting zero runs in the output of the quantizing circuit 4, an event counter 32 for counting the number of event occurrences by the count value of the zero run counter 31, an event converting circuit 33 for converting an event, as hereinafter described, in accordance with the count value of the event counter 32, and a variable-length encoder 34 for encoding the output of the event converting circuit 33 into a variable-length code.

The operation will now be described.

Since the basic operation of the fourth embodiment is similar to that of the foregoing third embodiment, only differences are described herein. FIG. 17 shows an example of quantization bit code selection. In the fourth embodiment, the predicted memory usage in the buffer memory 11 and the activity index are taken as the deciding factors. Thus, when it is predicted that the usage of the buffer memory 11 is nearing its full capacity, the number of quantization bits is reduced, as in the case of the third embodiment, so that the probability increases that post-quantization values become zero. As a result, the code length after variable-length encoding decreases per pixel. In this manner, the code amount decreases as the buffer memory 11 nears its full capacity, thus providing effective control against overflow. When the situation has reached or is expected to reach the critical point at which an overflow occurs, the variable-length encoding may be cut off, for example, at point A at the high frequency side shown in FIG. 11, as in the case of the third embodiment.

In the variable-length encoding circuit 5, the zero run counter 31 for counting zero runs is usually provided to count the contents of events (zero run length and nonzero value) preparatory to variable-length encoding. The zero run counter 31 notifies the occurrence of a code for every event to the event counter 32 which counts the number of events to predict the code amount to be generated. For example, the average number of events per block is obtained, which is fed back to the quantization bit number deciding circuit 14 which, considering both the average number and the activity index, decides the number of quantization bits as shown in FIG. 17, thereby controlling the code amount.

Independently of the above feedback, the number of events is counted by the event counter 32, and after the total number of events has been counted, the event converting circuit 33 performs a control on the code amount. When it is predicted by the event counter 32 that the code amount is likely increased, for example, the control is performed in the following manner. There are some events whose nonzero value may be reduced to zero if the value is divided by 2 and truncated to a whole number. This occurs when the nonzero value is 1. When a new zero value occurs in an event, the run length of that event is added to the run length of the next event and 1 is further added to this sum to provide the run length of a new event. This can be described by the following specific example.

Suppose, for example: the kth event has a run length of 5 and a nonzero value of 6; the (k+1)th event has a run length of 2 and a nonzero value of 1; and the (k+2)th event has a run length of 7 and a nonzero value of 17.

In this example, if the control is performed as a result of code amount prediction so as to reduce the code amount, the following results will be obtained.

The kth event will have a run length of 5 with a nonzero value reduced to 3;

the (k+1)th event will have a run length of 2 with a nonzero value reduced to 0; and the (k+2)th event will have a run length of 7 with a nonzero value reduced to 8.

Since, at this time, a new zero value occurs in the (k+1)th event, the (k+2)th event is combined with the (k+1)th event to create a new (k+1)th event. The new (k+1)th event has a run length of 10, which is given by 2+7+1, and a nonzero value of 8. The old (k+3)th event is now a new (k+2)th event, the old (k+4)th event is now a new (k+3)th event, and thus, new events are sequentially created, reducing the number of events by the number of newly generated zero values.

Figure 18:
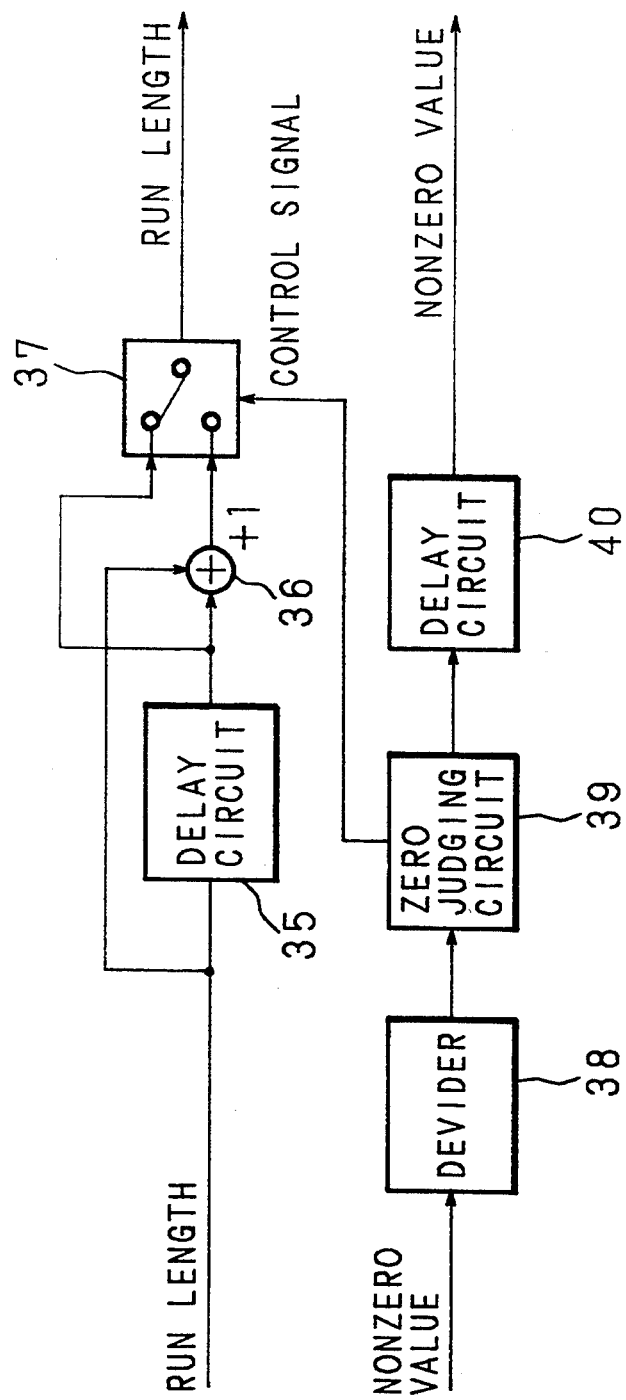
FIG. 18 is a diagram showing the configuration of an event converting circuit in the fourth embodiment.

FIG. 18 shows the internal configuration of the event converting circuit 33 which performs the above-described operation. The event converting circuit 33 comprises: a delay circuit 35 for outputting the input run length with a delay of one event; an adder 36 which adds the output of the delay circuit 35 to the input run length and further adds 1 to this sum; a switch 37 that can be switched between two input terminals, one terminal being supplied with the output of the delay circuit 35 and the other being supplied with the output of the adder 36; a divider 38 which divides the input nonzero value by 2 and truncates the result to a whole number; a zero judging circuit 39 which judges if the output of the divider 38 is zero or not and which, when the output is zero, issues a control signal to the switch 37 and, when the output is not zero, directly outputs the nonzero value; and a delay circuit 40 for outputting the input nonzero value with a delay of one event. When the control signal is given from the zero judging circuit 39, the switch 37 selects the output of the adder 36 and, when the control signal is not given, is selects the output of the delay circuit 35.

The provision of the above configured event converting circuit 33 offers the advantage, for example, that the number of quantization bits, once set for the quantizing circuit 4, can be easily changed using only one zero run counter. Without the event converting circuit 33, two zero run counters, one for prediction of the variable-length code amount and the other for use after changing the number of quantization bits, would be required.

Dividing nonzero values is not an essential element for the operation of the event converting circuit 33; it will also be possible to change the contents of an event by forcibly converting to zero a nonzero value whose absolute value is smaller than a value 1. The event conversion does not necessarily have to be performed uniformly on each block, but may be performed adaptively with emphasis, for example, on portions quantized with higher bit codes by the quantizing circuit 4 or on high frequency components. The event conversion using the ½ division is equivalent to changing the number of quantization bits from n bits to (n−1) bits.

Figure 19:
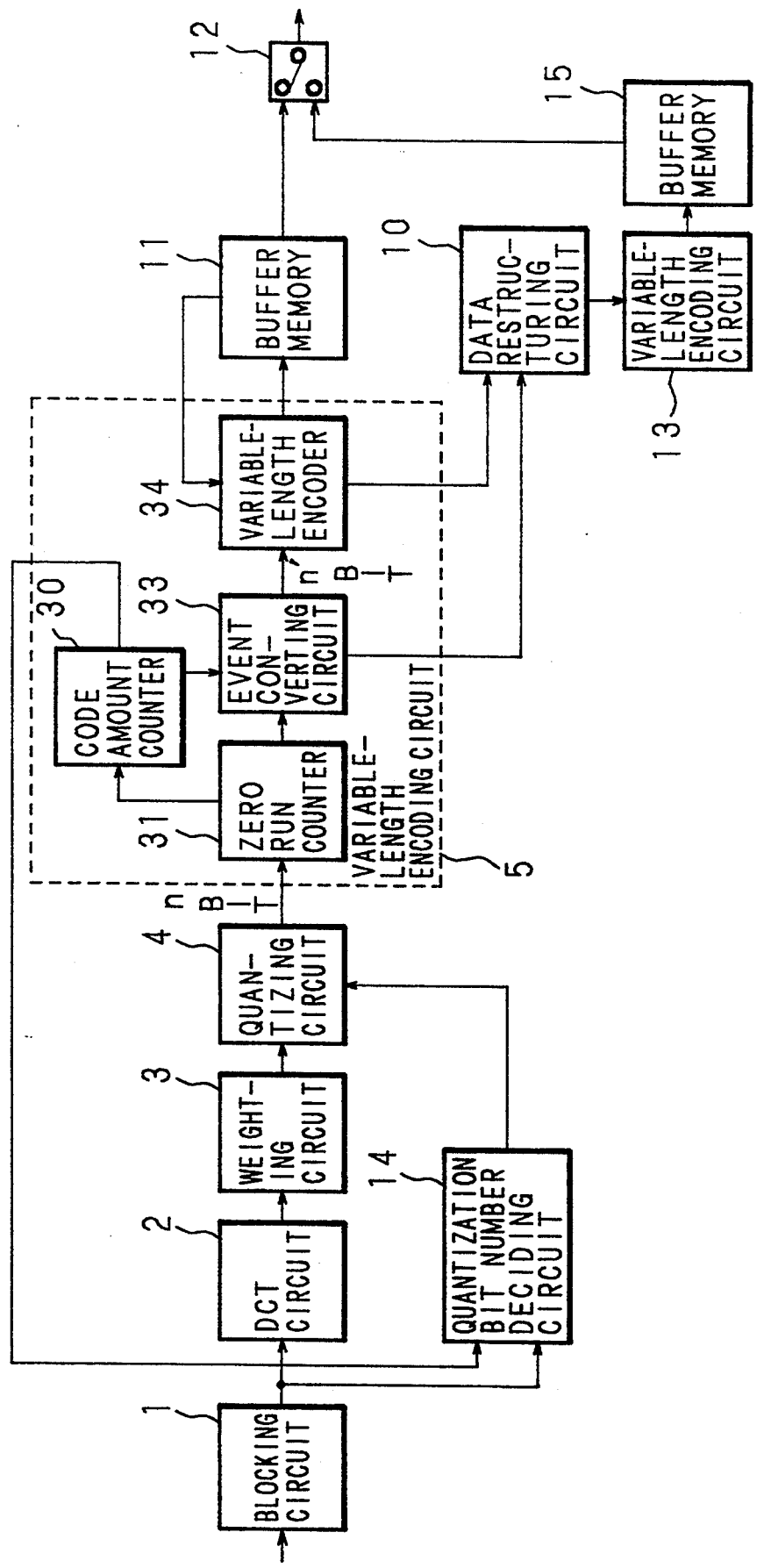
FIG. 19 is a diagram showing an alternative configuration of the fourth embodiment.

FIG. 19 is a block diagram showing an alternative configuration of the fourth embodiment. In this configuration, a code amount counter 30 for counting the code amount is used instead of the event counter 32 in FIG. 16. The code amount counter 30 counts the generated code amount from the zero run length and nonzero value supplied from the zero run counter 31. At completion of each block, the number of bits such as EOB (end of block, a character that indicates the completion of a block) are added to the counted amount, which is divided by the number of blocks already counted to predict the entire code volume to be generated.

Data that has not been transmitted because of generation of new zeros by the event converting circuit 33 is restructured by the data restructuring circuit 10. If the code amount has failed to reach the predicted value, the restructured data can be encoded as additional data to provide further accurate control. Such additional data is encoded by the variable-length coding circuit 13 and stored in the buffer memory 15, and if the output of the buffer memory 11 falls short of the maximum transmissible code amount, the additional data stored in the buffer memory 15 is transmitted by time-multiplexing through the switch 12, thus enabling the additional data to be transmitted up to the maximum transmissible limit.

On the other hand, when the code amount predicted by the event counter 32 or the code volume counter 30 exceeds the maximum transmissible limit, DCT coefficients with smaller absolute values are cut off in ascending order of the absolute value, because DCT coefficients with smaller absolute values less affects the image quality when cut off. Therefore, counting the number of events having DCT coefficients with smaller absolute values is important in grasping the code amount after code amount control. More specifically, if the number of events having DCT coefficients with absolute values 1, 2, or 3 is counted separately by the event counter 32 or the code amount counter 30 and the event conversion is performed using this number information in conjuction with the result of code amount prediction, further accurate control of the code amount can be achieved.

That is, the events with an absolute value 1 are converted to non-transmission events by the above-mentioned ½ division, and by accurately grasping the number of such non-transmission events, it is possible to increase the control accuracy. For example, in such cases where events with an absolute value 1 seldom occur but events with absolute values 2 or 3 frequently occur, it becomes necessary to create non-transmission events using a ¼ division, in which case the event converting circuit 33 should be directed to perform a ¼ division or to forcibly convert the events with absolute values 1, 2, or 3 to non-transmission events. This serves to further enhance the control accuracy.

Figure 20:
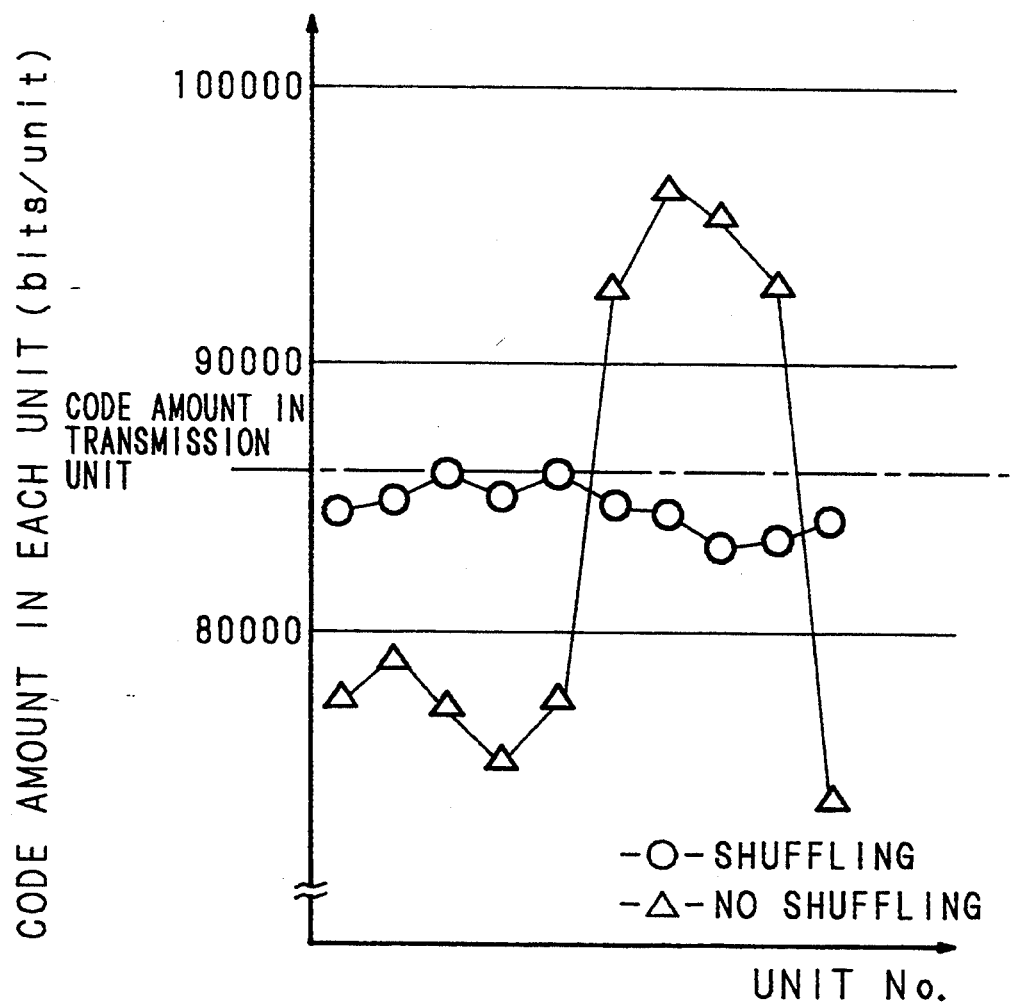
FIG. 20 is a graph showing code length variations equalized by shuffling in the fourth embodiment.

When recording data on a VTR tape using the above described control, the code amount greatly varies depending on the image pattern to be recorded, as previously noted. It is also noted previously that it is convenient to fix the data length to a length calculated by dividing the track length by an integer. It is usually most convenient to fix the data length by dividing one field or one frame or m frames into n units. FIG. 20, for example, shows the generated code amount when one frame is divided into 10 units. The symbol -Δ- in FIG. 20 represents the code amount. As shown, four out of the 10 units largely exceeds the transmissible limit, while the other six units are far below the limit. Since the cutoff control is exercised on the four units to a large extent, the code amount has to be reduced, sacrificing the signal-to-noise ratio to a certain degree, while on the other hand, an improvement in the signal-to-noise ratio is expected for the remaining six units with the addition of additional data, etc. When the code amount is controlled between the units in accordance with the fourth embodiment, such a bias in the code amount distribution can be disregarded since the code amount overflown from the four units can be transmitted using the other six units (actually, using units in the next frame).

However, processing covering too many units only serves to complicate the hardware configuration and does not provide worthwhile advantages. It is therefore important to devise so that the processing will be completed within each unit. That is, it is important to minimize the bias in the code amount within each unit. One approach to this is to equalize the generated code amount between the units by shuffling the blocks so that any given DCT block and four DCT blocks most adjacent to the given DCT block belong to different units. The code amount generated as a result of such shuffling is shown by the symbol -O- in FIG. 20. As can be seen from FIG. 20, the shuffling has served to substantially equalize the generated code amount. Controlling the code amount within each unit after equalizing is extremely advantageous in terms of the following points. Since the code amount control is performed only within each unit, the hardware is very simple in construction. Even when the code amount control is performed within each unit, there occurs no need to reduce the rate for a particular portion within one frame, as a result of which degradation in the signal-to-noise ratio is prevented from concentrating on a particular portion on the screen.

Figure 21:
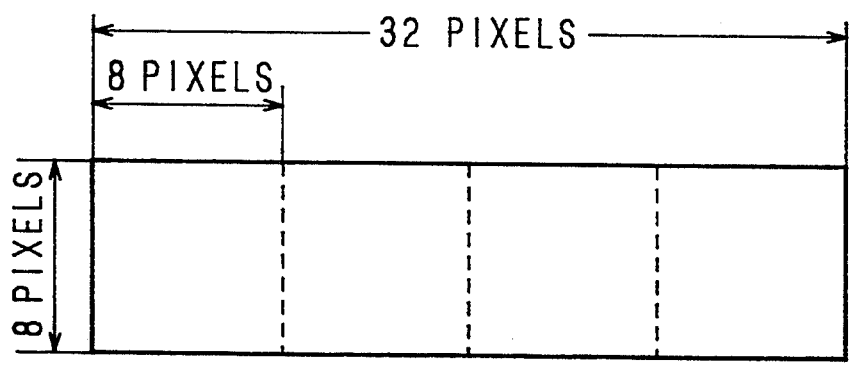
FIG. 21 is a diagram showing shuffling units for a sample ratio of 4:1:1 in the fourth embodiment.

When special replay modes are considered, it will be more convenient if the code amount is controlled after performing the above-mentioned shuffling by grouping together DCT blocks of the chrominance signal having a fewer number of samples. More specifically, when the sample ratio between the luminance and chrominance signals is 4:1:1, for example, four horizontally successive DCT blocks as shown in FIG. 21 are grouped into a shuffling unit and shuffling is performed on this unit, after which the code amount is controlled within this unit. In the case of special replay modes, some blocks may not be reproducible, but when shuffling is performed on the above configured unit, reproduction is possible with both the luminance and chrominance signals balanced. Without such shuffling, the second DCT block from left of the luminance signal, for example, may be dropped, resulting in serious degradation in special replay mode image quality.

Figure 22:
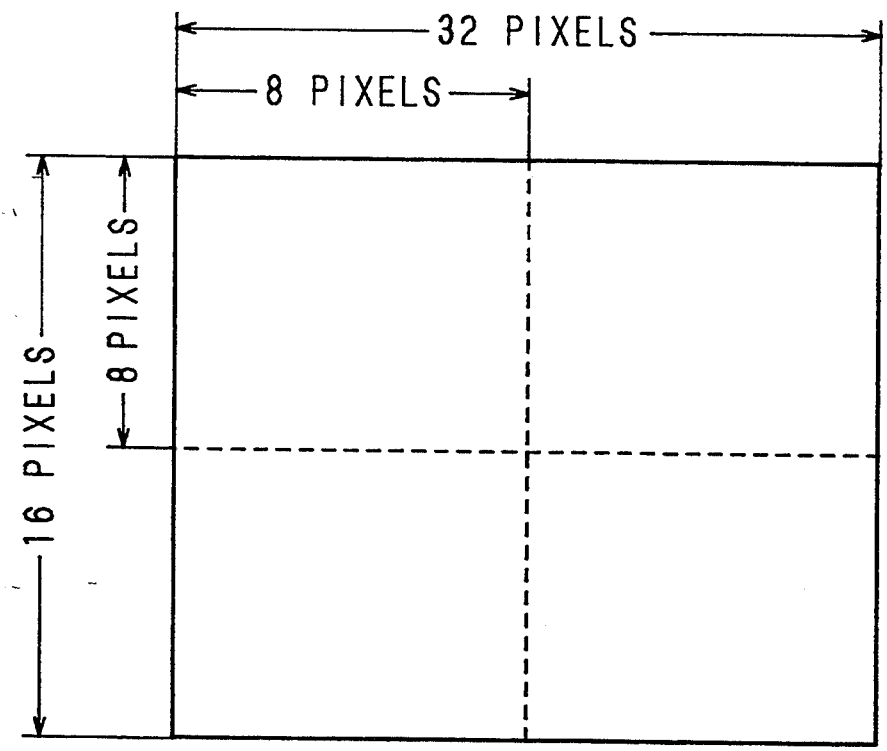
FIG. 22 is a diagram showing shuffling units for a sample ratio of 4:2:0 in the fourth embodiment.
Figure 23:
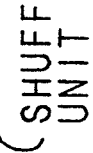
FIG. 23 is a diagram showing an example of shuffling in the fourth embodiment.
Figure 24:
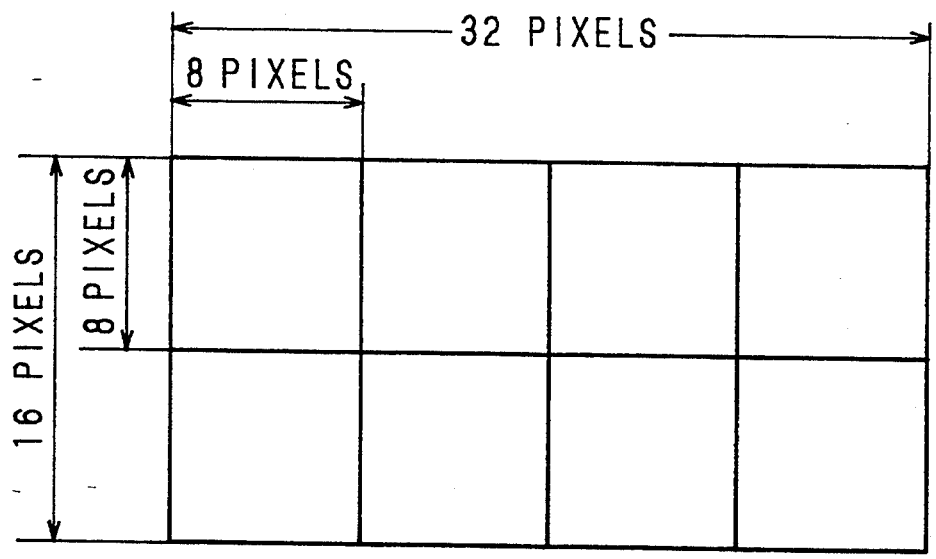
FIG. 24 is a diagram showing shuffling units for a sample ratio of 4:1:0 in the fourth embodiment.

Further, when the sample ratio between the luminance and chrominance signals is 4:2:0 (color line sequential processing), for example, the above-described shuffling is performed by grouping two horizontally adjacent and two vertically adjacent DCT blocks into one shuffling unit. With this grouping, the area size that one DCT block of the chrominance signal takes on the screen becomes equal to the shuffling unit of the luminance signal. With this as one shuffling unit, the shuffling as shown in FIG. 23 is performed. FIG. 23 shows an example of shuffling in the case of the shuffling unit shown in FIG. 22 when the sample ratio between the luminance and chrominance signals is 4:2:0 and when one field is divided into five units. FIG. 24 is an example of shuffling when the sample ratio between the luminance and chrominance signals is 4:1:0.

Embodiment 5

When a plurality of blocks is grouped into a unit, it has been a usual practice to perform encoding unit by unit starting from a particular position on the screen (e.g. from the upper left of the screen). Therefore, the code amount varies largely from unit to unit, and there arises the problem that the transmission efficiency decreases when the upper limit of data amount is set to match the units having a larger code amount. The fifth embodiment and the subsequent sixth embodiment of the invention are provided aiming at overcoming such a problem.

Figure 25:
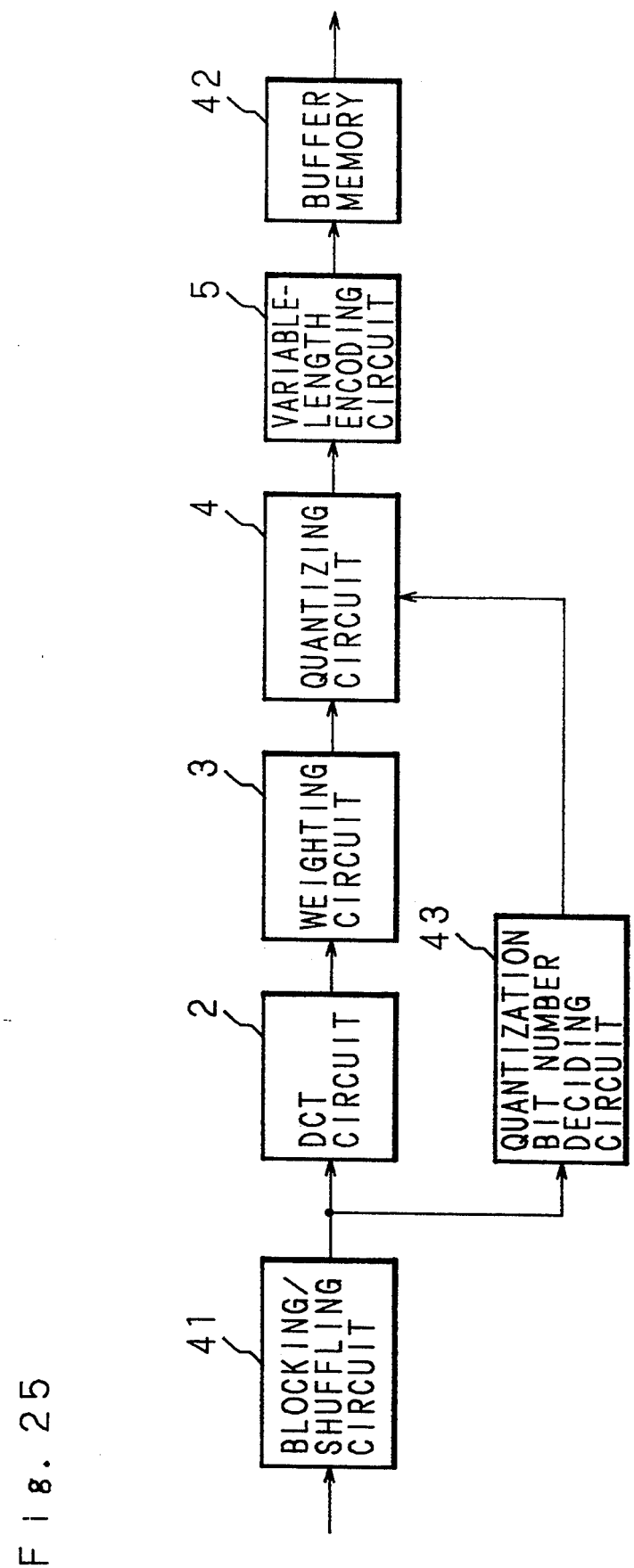
FIG. 25 is a diagram showing the configuration of a video signal encoding apparatus in accordance with a fifth embodiment of the invention.

FIG. 25 is a block diagram showing the configuration of a video signal encoding apparatus in accordance with the fifth embodiment of the invention. In FIG. 25, the reference numerals 2, 3, 4, and 5 designate a DCT circuit, a weighting circuit, a quantizing circuit, and a variable-length encoding circuit, respectively. These circuits are identical to those shown in FIG. 9. At the front stage of the DCT circuit 2, there is provided a blocking/shuffling circuit 41 for dividing a digital video into blocks of a plurality of pixels and shuffling the thus obtained blocks. The block data is supplied from the blocking/shuffling circuit 41 to the DCT circuit 2. The quantizing circuit 4 quantizes the weighted DCT coefficient with the number of quantization bits decided by a quantization bit number deciding circuit 43 and supplies the quantized DCT coefficient to the variable-length encoding circuit 5. The variable-length encoding circuit 5 encodes the quantized DCT coefficient into a variable-length code and supplies the variable-length code data to a buffer memory 42.

The operation will now be described.

A digital video signal is inputted in scanning line sequence to the blocking/shuffling circuit 41 where the signal is divided into blocks of n×n pixels within one field or one frame and then shuffled in accordance, for example, with the shuffling format shown in FIG. 26. One block in FIG. 26 corresponds to one DCT block and the outer frame corresponds to that of the television screen. When the luminance signal conforming to the NTSC system is sampled at a rate of 13.5 MHz, for example, the effective scanning area per frame covers 720 pixels in the horizontal direction and 486 pixels in the vertical direction. When one frame is divided into blocks of 8×8 pixels, for example, there remain six pixels each in the vertical direction; therefore, it is supposed here to encode the picture signal for 720×480 pixels, discarding the data for the three horizontal scanning lines from the top and bottom of the screen. Since the video signal is divided into blocks of 8×8 pixels, this means 90×60 blocks, i.e., 5,400 blocks in total. That is, when the block address in the horizontal direction within one frame is denoted as i and that in the vertical direction as j, i is expressed as $1 \leq i \leq 90$ and j as $1 \leq j \leq 60$.

Furthermore, the 5,400 blocks are grouped into N units. In FIG. 26, N=5, and the alphabetic characters in A1, B1, etc. assigned to each block indicate the names of the units. Since N=5, there are five unit names A to E. The numeric parts in A1, B1, etc. are numbers indicating the encoding sequence within each unit.

In FIG. 26, encoding is performed, as a general rule, from left to right and from top to bottom of the screen. In the example shown, since there are 90 blocks in the horizontal direction, the second line from top in FIG. 26 begins with the number 19 which is given by dividing 90 by N (=5) and adding 1 to the quotient. Therefore, the block address (i, j) for the kth encoding in the uth unit can be expressed by the following equation (1) (provided that (1, 1) indicates the top left corner of the screen and (90. 60) the bottom right corner). .pa $$\left. \begin{array}{l} i = N \times \mathrm{mod}\left(k - 1, \dfrac{90}{N}\right) + \\ \qquad \mathrm{mod}\left(u + \left[\dfrac{(k-1) \times N}{90}\right] - 1, N\right) + 1 \\ j = \left[\dfrac{(k-1) \times N}{90}\right] + 1 \end{array} \right\} \quad (1)$$

[a]: Largest integer not exceeding a

For example, when u=2 and k=20, the block address is given by:

$i = 5 \times mod(20-1, 18) + mod[2 + [(19 \times 5)/90] - 1, 5] + 1 = 5 \times 1 + mod(2, 5) + 1 = 5 + 2 + 1 = 8$ $j = [(19 \times 5)/90] + 1 = 2$ Thus, the block address (8, 2) is obtained. Also, u=2 indicates the unit name is B, and in FIG. 26, the address (8, 2) designates the block B20. Likewise, the address of the block C57, for example, can be found as follows:

$i = 5 \times mod(57-1, 18) + mod[3 + ](56 \times 5)/90] - 1, 5] + 1 = 5 \times 2 + mod(3+3-1, 5) + 1 = 10 + 0 + 1 = 11$ $j = 4$ which gives the address (11, 4). That is, FIG. 26 shows the arrangement of blocks after performing shuffling as expressed by the equation (1).

After the above shuffling, each block is sequentially fed to the discrete casine circuit 2 for a DCT transform and is then weighted by the weighting circuit 3. The quantization bit number deciding circuit 43 calculates the activity index of each block, on the basis of which the number of quantization bits is decided for the block, the information being fed to the quantizing circuit 4. The weighted DCT coefficient is quantized by the quantizing circuit 4 using the number of quantization bits thus decided, and the quantized data is then encoded by the variable-length encoding circuit 5 using such methods as Huffman encoding, the encoded data being transferred to the buffer memory 42 for storage therein.

As the above shuffling, the patterns represented by the blocks to be coded are randomly dispersed, and therefore, the code length is equalized between the units when the number of blocks is greater than a certain degree. Accordingly, it has been found that, when the units are assigned by shuffling as shown in FIG. 26, the dispersion value indicating the dispersion of the code amount is reduced to 1/5 to 1/10, compared to when a particular position on the screen is grouped together in a unit without shuffling.

Next, the features of this shuffling will be considered. When considering the effects that the shuffling has on the code amount, the point is to avoid concentrating the blocks of the same pattern in the same unit, which leads to the following point when considered in conjunction with pixels. Blocks neighboring an attention block often have similar patterns, therefore, processing is performed to assign neighboring blocks to different units. This processing is described below using the concept of neighborhood.

Figure 27:
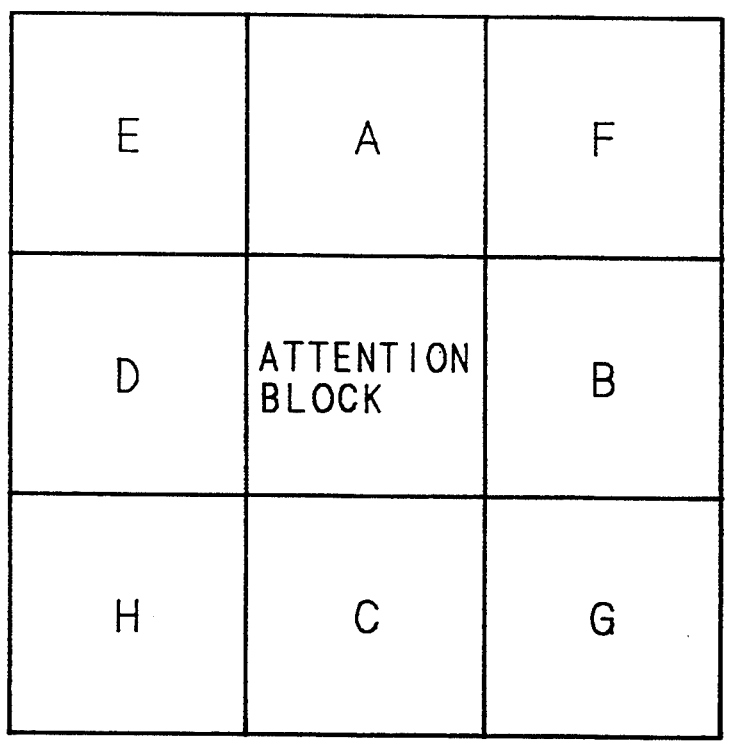
FIG. 27 is a diagram explaining the principle of shuffling in the fifth embodiment.

Each of the nine squares in FIG. 27 represents a DCT block. There are eight blocks (A to F in FIG. 27) that neighbors an attention block. These blocks are referred to as the eight neighboring blocks, of which the four blocks A, B, C, and D that are most adjacent to the attention block are called the four neighboring blocks. Referring back to FIG. 26, it can be seen that when attention is given to a given block, none of its four neighboring blocks belong to the same unit as the attention block. Of its eight neighboring blocks, there are only two blocks that belong to the same unit. The four neighboring blocks that are spatially most adjacent to the attention block are thus made to belong to different units in order to prevent similar patterns from being concentrated in one unit. This serves to equalize the code amount.

Figure 28:
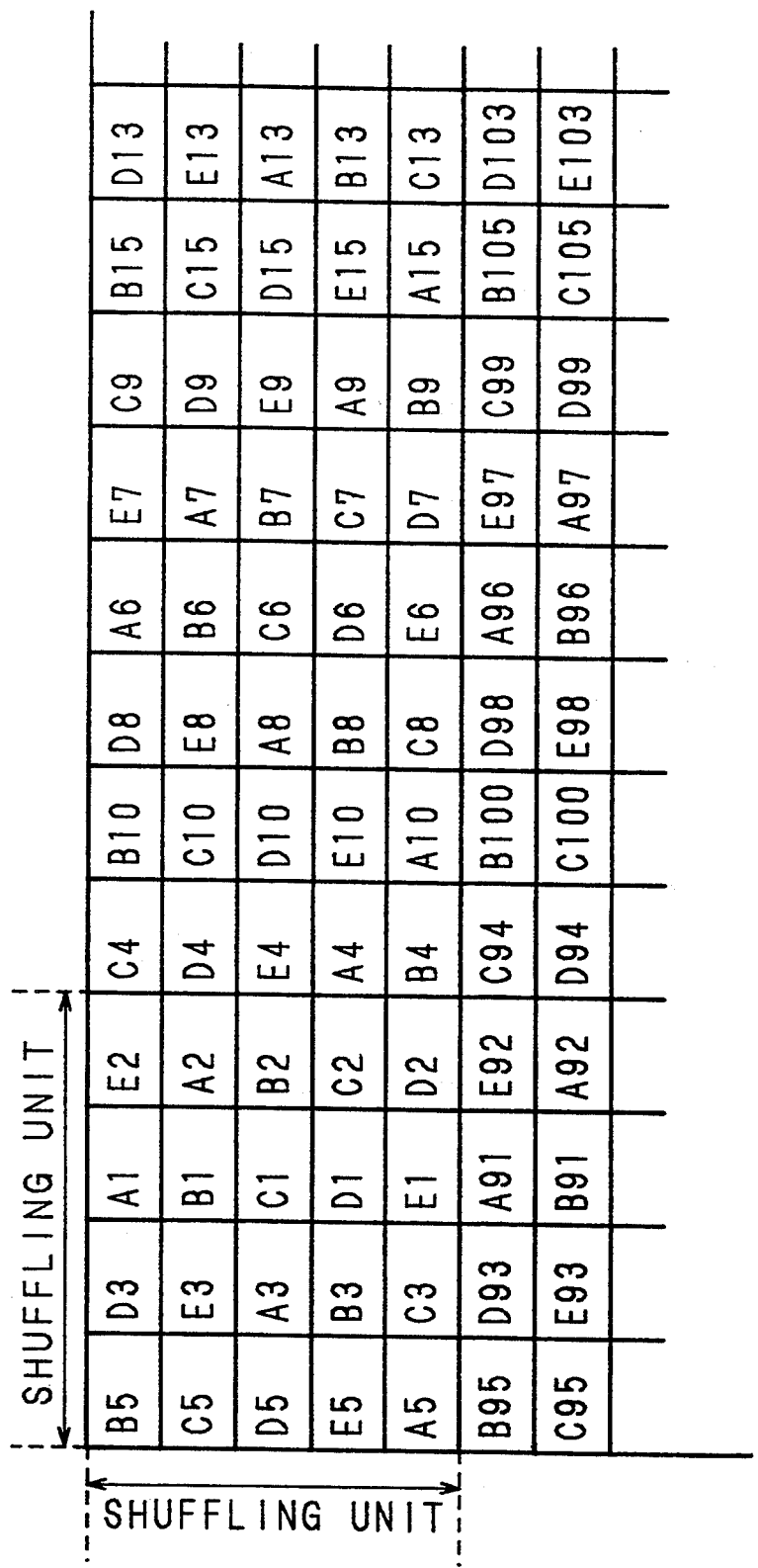
FIG. 28 is a diagram showing an example of shuffling in the fifth embodiment.
Figure 29:
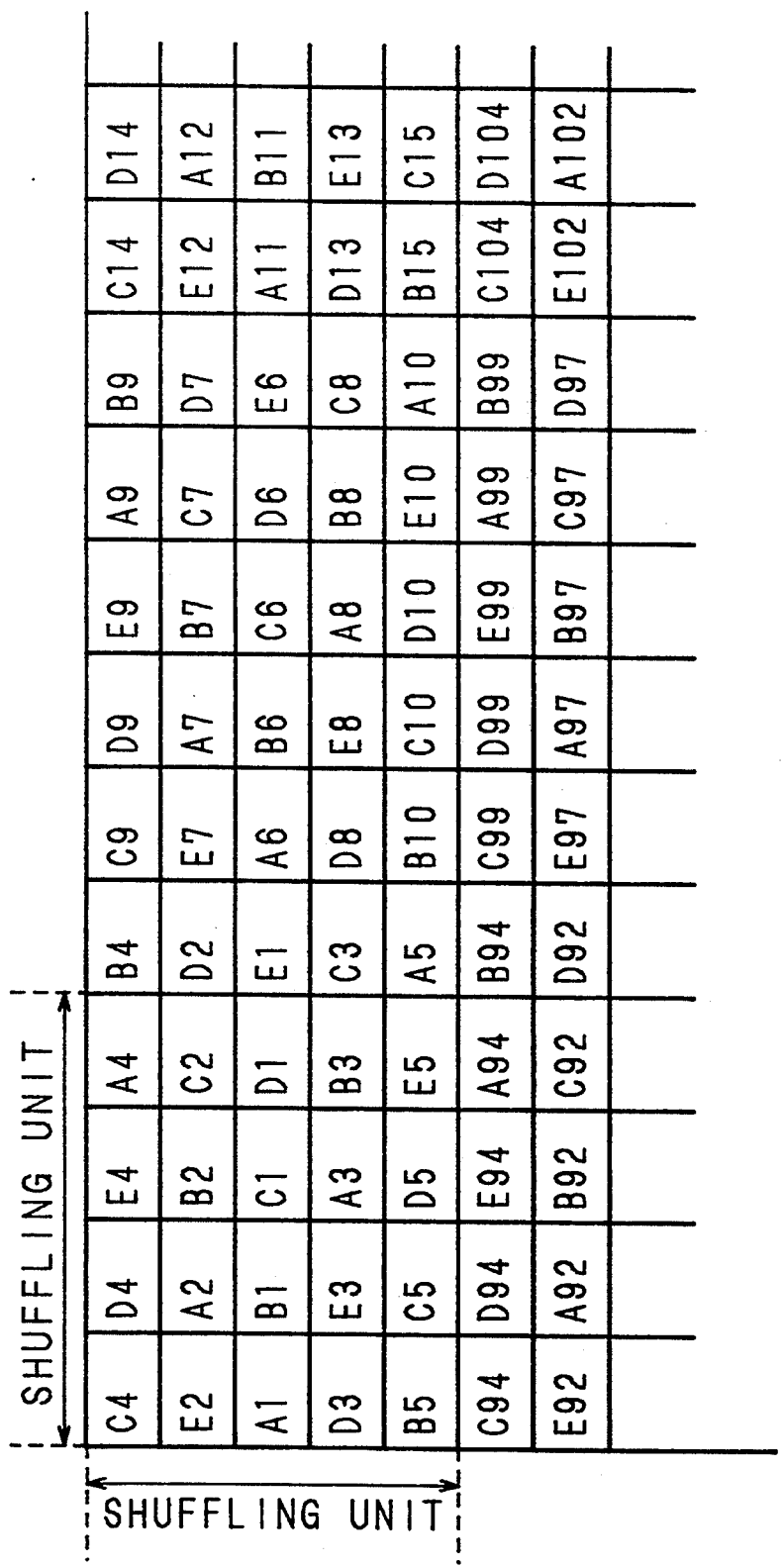
FIG. 29 is a diagram showing another example of shuffling in the fifth embodiment.
Figure 30:
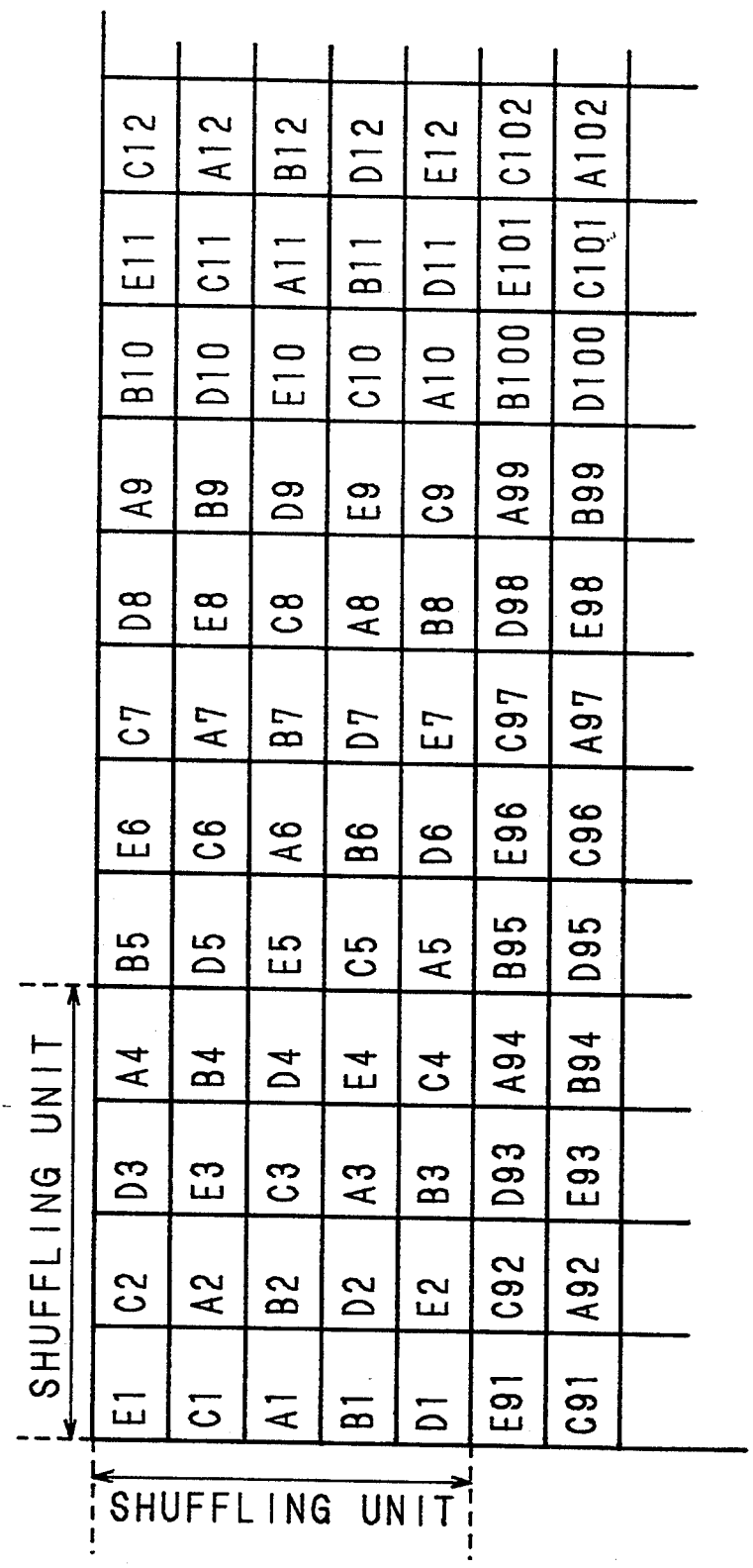
FIG. 30 is a diagram showing still another example of shuffling in the fifth embodiment.

This effect can be achieved not only by the equation (1) but by many other methods. FIGS. 28 to 30 show only a few examples of the many methods. In the examples of shuffling shown in FIGS. 28 to 30, there are no four neighboring blocks that belong to the same unit. The block address (i, j) in FIG. 28 is expressed by the following equation. .pa $$i = \left[\frac{\mod(k - 1, 90)}{N}\right] \times N + \left[\frac{N+1}{2}\right] + (-1)^{\mod(k,N)} \times \left[\frac{\mod(k,N)}{2}\right]$$

$$j = \mod(\mod(k - 1, 90) + u - 1, N) + 1 + N \times \left[\frac{k-1}{90}\right]$$

For example, to find the address of the block D98, since u=4 and k=98, $$i = [\{\mod(97, 90)\}/5] \times 5 + 3 + (-1)^3 \times [\{\mod(98, 5)\}/2] = 5 + 3 - 1 = 7$$

$$j = \mod(7+4-1, 5) + 1 + 5 \times 1 = 0 + 1 + 5 = 6$$

which gives the address (7, 6). The block address (i, j) in FIG. 29 is expressed by the following equation.

$$i = \mod(\mod(k - 1, 90) + u, N) + \left[\frac{\mod(k - 1, 90)}{N}\right] \times N$$

$$j = \left[\frac{k-1}{90}\right] \times N + \left[\frac{N+1}{2}\right] + (-1)^{\mod(k-1,N)} \times \left[\frac{\mod(\mod(k - 1, 90), N) + 1}{2}\right]$$

For example, to find the address of the block E102, since u=5 and k=102, $$i = \mod(11+5, 5) + [11/5] \times 5 = 1 + 10 = 11$$

$$j = 1 \times 5 + 3 + (-1) \times [\{\mod(11, 5)+1\}/2] = 5 + 3 - 1 = 7$$

which gives the address (11, 7). Likewise, there exists an equation that realizes the shuffling shown in FIG. 30, along with various other equation that achieve various other shuffling formats.

Figure 31:
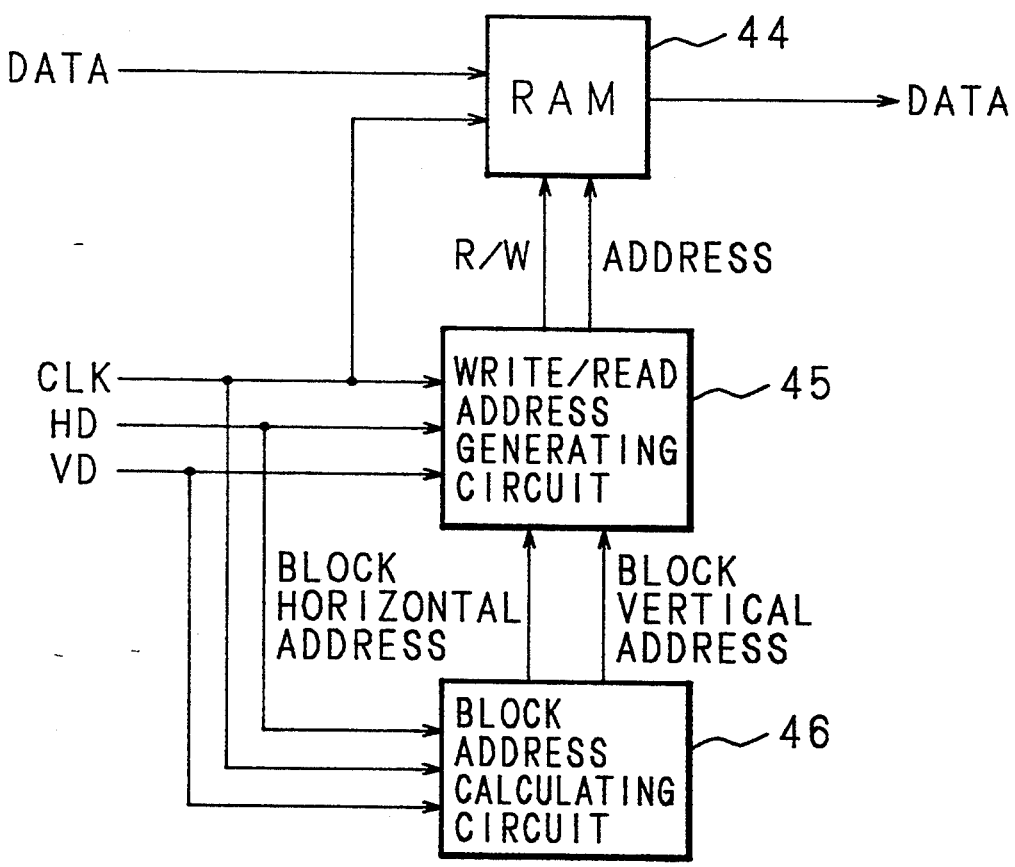
FIG. 31 is a diagram showing the configuration of a shuffling circuit in the fifth embodiment.

The circuit that performs the above shuffling operations can be implemented in the configuration shown in FIG. 31. In the figure, the reference numeral 46 designates a block address calculating circuit for calculating the block horizontal address (i) and the block vertical address (j) using the above given equations, and the block address obtained by the block address calculating circuit 46 is supplied to a write/read address generating circuit 45. On the basis of the supplied block address, the write/read address generating circuit 45 outputs a write/read address to a RAM 44. In the RAM 44, each block is arranged according to the address, thus achieving the shuffling as shown in FIGS. 26, 28, 29, and 30.

Embodiment 6

With the above shuffling, the code amount is substantially equalized between the units within one field or one frame, but in the case of a time-varying image, the image pattern may completely change after several seconds, causing the code amount of each unit within one field or one frame to increase or decrease. If the code amount increases in each unit, it may exceed the maximum transmissible data amount. This presents a serious problem, particularly in the case of a helical scan VTR, since, as previously described, each track is divided into lengths so that each length is the result of dividing the track length by an integer, each limited fixed amount being assigned to codes for a fixed number of blocks. The sixth embodiment of the invention is devised to overcome this problem. The following describes the sixth embodiment.

Figure 32:
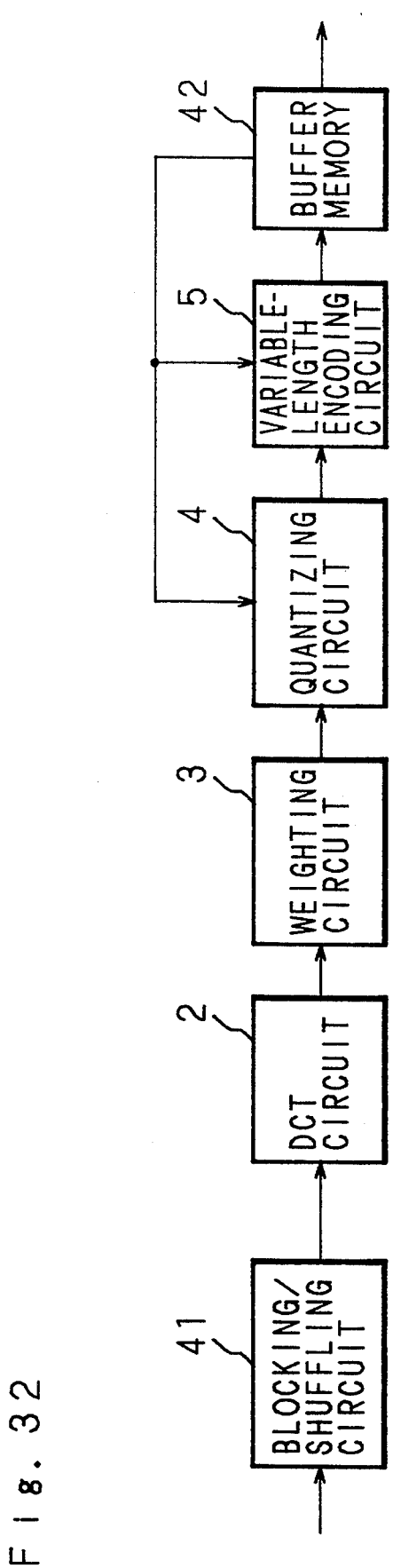
FIG. 32 is a diagram showing the configuration of a video signal encoding apparatus in accordance with a sixth embodiment of the invention.
Figure 33:
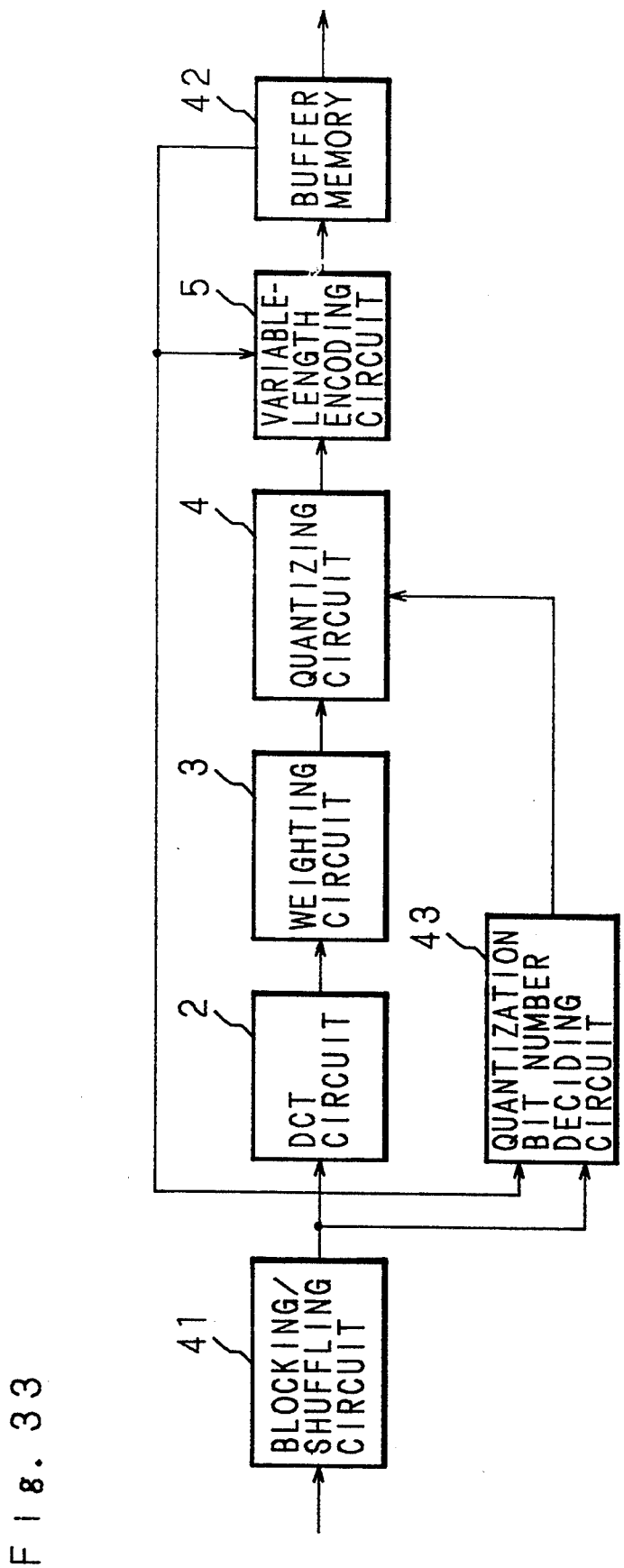
FIG. 33 is a diagram showing an alternative configuration of the sixth embodiment.

FIGS. 32 and 33 are block diagrams each showing the configuration of a video signal encoding apparatus in accordance with the sixth embodiment. In FIG. 32, the quantizing circuit 4 and the variable-length encoding circuit 5 are controlled using the information on the memory usage in the buffer memory 42. In FIG. 33, the quantization bit number deciding circuit 43 and the variable-length encoding circuit 5 are controlled using the information on the memory usage in the buffer memory 42.

The buffer memory 42 has the capacity to store data of the volume that matches the limit code amount. When the buffer memory 42 nears its full capacity, the probability increases that codes will be generated that may exceed the transmissible limit, and therefore, control is performed to reduce the number of quantization bits, cut off the variable-length encoding, etc. However, such control only succeeds in reducing the code amount by sacrificing the image quality after decoding. As a result of the afore-mentioned shuffling, there is a possibility, for example, that such control may be effected while processing the center portion of the screen. Since the probability is high that such control is performed on the blocks near the end of each unit, the blocking/shuffling circuit 41 operates in such a manner that the blocks entered near the end of each block are positioned at the edge of the screen. An example of such shuffling is shown in FIG. 34.

In FIG. 34, it can be seen that blocks with smaller numbers are clustered nearer to the center of the screen, while blocks with larger numbers are clustered on both sides of the screen. Furthermore, in FIG. 34, which shows the shuffling with N=5, none of any attention block and the four neighboring blocks belong to the same unit. When the block address of the kth block in the uth unit is denoted as (i, j), the shuffling shown in FIG. 34 is expressed by the following equation.

$$i = \frac{90}{2} - (-1)^{[\{(k-1)N\}/60]} \times \left[\frac{\left[\frac{(k-1)\cdot N}{60}\right] + 1}{2}\right]$$

$$j = \left[\frac{60+N}{2N}\right] - 1 \times N + 1 - (-1)^{mod\{(k-1),(60/N)\}} \times$$

$$N \times \left[\frac{mod\left(k - 1, \frac{60}{N}\right) + 1}{2}\right] +$$

$$mod\left[\left[\frac{(k-1)N}{60}\right] + u - 1, N\right]$$

For example, to find the address of the block C134, since u=3 and k=134, $$i = 45 - (-1)^{11} \times [6] = 45 + 6 = 51$$

$$j = ([65/10] - 1) \times 5 + 1 - (-1)^1 \times 5 \times 1 + mod(11+3-1, 5) = 26 + 5 + 3 = 34$$

which gives the address (51, 34).

There are many examples of such shuffling, other than that described above, some of which are shown in FIGS. 35 to 39. In FIGS. 37 to 39, the block vertical address starts from the top of the screen; it has been confirmed by simulation that distortion is likely to occur on both sides of the screen, as in the case of FIG. 34. The shuffling of FIG. 38 is similar to that of FIG. 37, except that N=10, providing 10 units names A to K (I is not used as it can be confused with 1). Also, the shuffling of FIG. 39 is similar to that of FIG. 37, except that N=3. The shuffling such as shown in FIG. 37 is expressed by the following equation.

$$i = \frac{90}{2} - (-1)^{[\{(k-1)\cdot N\}/60]} \times \left[\frac{\left[\frac{(k-1)\cdot N}{60}\right] + 1}{2}\right]$$

$$j = N \times mod\left(k - 1, \frac{60}{N}\right) + 1 +$$

$$mod\left[\frac{(k-1)\cdot N}{60}\right] + u - 1,$$

N For example, in FIG. 37, to find the address of the block E147, since u=5 and k=147, $$i = 45 - (-1)^{12} \times [(12+1)/2] = 45 - 6 = 39$$

$$j = 5 \times 2 + 1 + mod(12+5-1, 5) = 11 + 1 = 12$$

which gives the address (39, 12).

With the above-described shuffling, distortion resulting from the code amount control is driven to both sides of the screen. In the above equation, when N=2, the possibility may arise that some of four neighboring blocks belong to the same unit, but this is the problem that arises as a result of the shuffling so performed as to position the blocks nearer to the sides of the screen as k increases. Since such blocks appear only on limited portions of the screen, they do not substantially affect the distribution of the code amount. In an ordinary digital VTR, this does not present any problems in actual use since N is usually set at 3 or a greater number considering special replay modes, etc. In any of the above figures illustrating the shuffling, the operation is based on divisions with N as the modulus, but it will be appreciated that similar effects can be obtained when the divisions are performed by taking an integral multiple of N or a quotient of an integer by an integer of N as the modulus. For example, when N=10, usually 10 is taken as the modulus, but either 20 or 5[10×(½)] may be taken as the modulus.

In the above fifth and sixth embodiments, shuffling is performed in units of blocks, but alternatively, shuffling may be performed by, for example, grouping (t×s) blocks into one unit.

In the above six embodiments, orthogonal transform has been described by taking the DCT as an example, but it will be appreciated that orthogonal transforms other than the DCT, such as Hadamard transform, K-L transform, etc. may also be used. Also, the weighting circuit 3 may be omitted in a configuration in which the quantization width of the quantizing circuit 4 is made to vary depending on the frequency.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A video signal encoding apparatus for compressing and encoding a digital video signal, comprising:

block structuring means for structuring blocks each consisting of a plurality of pixels in the video signal;

transformation means for performing an orthogonal transform on each of the structure blocks to obtain a transform coefficient;

quantizing means for quantizing the transform coefficient;

encoding means for encoding the quantized data to obtain coded data; and decision means for determining a number of quantization bits for said quantizing means on the basis of an activity index of each block and an amount of the obtained coded data.

2. A video signal encoding apparatus for compressing and encoding a digital video signal containing a chrominance signal, comprising:

block structuring means for structuring the video signal into a matrix array of blocks each consisting of a plurality of pixels;

transformation means for performing an orthogonal transform on each of the structure blocks to obtain a transform coefficient;

encoding means for encoding the obtained transform coefficient to obtain coded data; and unit structuring means for structuring units, each unit including a plurality of blocks, prior to the orthogonal transform by said transformation means, by shuffling blocks such that any given shuffling unit and four shuffling units most adjacent to the given shuffling unit have different references, a reference of the shuffling unit being a number of blocks which the chrominance signal occupy on the screen.

3. A video signal encoding apparatus for compressing and encoding a digital video signal, comprising:

block structuring means for structuring the video signal into a matrix array of blocks each consisting of a plurality of pixels;

transformation means for performing an orthogonal transform on each of the structure blocks to obtain a transform coefficient;

encoding means for encoding the obtained transform coefficient to obtain coded data; and unit structuring means for structuring units, each unit including a plurality of blocks, prior to the orthogonal transform by said transformation means, such that any given block and four blocks most adjacent to the given block belong to different units.

4. A video signal encoding apparatus for compressing and encoding a digital video signal, comprising:

block structuring means for structuring the video signal into a matrix array of blocks each consisting of a plurality of pixels;

transformation means for performing an orthogonal transform on each of the structured blocks to obtain a transform coefficient;

encoding means for encoding the obtained transform coefficient to obtain coded data;

unit structuring means for structuring units, each unit including a plurality of blocks, prior to the orthogonal transform by said transformation means, such that any given block and four blocks most adjacent to the given block belong to different units;

decision means for determining an order in which the blocks are to be encoded, the order within each unit being such that encoding is performed starting with blocks nearer to a center of the screen and then proceeding to blocks nearer to sides of the screen; and control means for controlling the amount of coded data on a unit-by-unit basis.

5. A video signal encoding apparatus for compressing and encoding a digital video signal containing a chrominance signal, comprising:

block structuring means for structuring the video signal into a matrix array of blocks each consisting of a plurality of pixels;

transformation means for performing an orthogonal transform on each of the structure blocks to obtain a transform coefficient;

quantizing means for quantizing the transform coefficient;

encoding means for encoding the obtained transform coefficient to obtain coded data;

decision means for determining a number of quantization bits for said quantizing means on the basis of an activity index of each block and an amount of the obtained coded data; and unit structuring means for structuring units, each unit including a plurality of blocks, prior to the orthogonal transform by said transformation means, by shuffling blocks such that any given shuffling unit and four shuffling units most adjacent to the given shuffling unit have different references, a reference of the shuffling unit being a number of blocks which the chrominance signal occupy on the screen.

6. A video signal encoding apparatus for compressing and encoding a digital video signal, comprising:

block structuring means for structuring the video signal into a matrix array of blocks each consisting of a plurality of pixels;

transformation means for performing an orthogonal transform on each of the structure blocks to obtain a transform coefficient;

quantizing means for quantizing the transform coefficient;

encoding means for encoding the obtained transform coefficient to obtain coded data;

decision means for determining a number of quantization bits for said quantizing means on the basis of an activity index of each block and an amount of the obtained coded data; and unit structuring means for structuring units, each unit including a plurality of blocks, prior to the orthogonal transform by said transformation means, such that any given block and four blocks most adjacent to the given block belong to different units.

7. A video signal encoding apparatus for compressing and encoding a digital video signal, comprising:

block structuring means for structuring the video signal into a matrix array of blocks each consisting of a plurality of pixels;

transformation means for performing an orthogonal transform on each of the structured blocks to obtain a transform coefficient;

quantizing means for quantizing the transform coefficient;

encoding means for encoding the obtained transform coefficient to obtain coded data;

unit structuring means for structuring units, each unit including a plurality of blocks, prior to the orthogonal transform by said transformation means, such that any given block and four blocks most adjacent to the given block belong to different units;

decision means for determining an order in which the blocks are to be encoded, the order within each unit being such that encoding is performed starting with blocks nearer to a center of the screen and then proceeding to blocks nearer to sides of the screen and for determining a number of quantization bits for said quantizing means on the basis of an activity index of each block and an amount of the obtained coded data; and control means for controlling the amount of the obtained coded data on a unit-by-unit basis.

* * * * *